US011924732B2

(12) United States Patent
Qaisrani et al.

(10) Patent No.: US 11,924,732 B2
(45) Date of Patent: Mar. 5, 2024

(54) EMERGENCY COMMUNICATION IN NON-CELLULAR COVERAGE

(71) Applicant: Apple Inc., Cupertino, CA (US)

(72) Inventors: Babar Qaisrani, Issaquah, WA (US); Biljana Badic, Munich (DE); Gaurav Lamba, Cupertino, CA (US); Krisztian Kiss, Hayward, CA (US); Mona Agnel, Uxbridge (GB); Rafael L Rivera-Barreto, Santa Clara, CA (US); Rohan C Malthankar, San Jose, CA (US); Sudeep Manithara Vamanan, Nuremberg (DE); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 17/483,936

(22) Filed: Sep. 24, 2021

(65) Prior Publication Data
US 2022/0109969 A1 Apr. 7, 2022

Related U.S. Application Data

(60) Provisional application No. 63/086,470, filed on Oct. 1, 2020.

(51) Int. Cl.
*H04W 4/90* (2018.01)
*H04W 4/029* (2018.01)
(Continued)

(52) U.S. Cl.
CPC ............ *H04W 4/90* (2018.02); *H04W 4/029* (2018.02); *H04W 4/80* (2018.02); *H04W 76/14* (2018.02); *H04W 76/50* (2018.02); *H04W 92/18* (2013.01)

(58) Field of Classification Search
CPC ..... H04W 4/029; H04W 76/50; H04W 76/14; H04W 4/80
(Continued)

(56) References Cited

U.S. PATENT DOCUMENTS

| 5,787,345 A | * | 7/1998 | Moon ..................... H04W 4/10 455/527 |
| 10,674,319 B1 | | 6/2020 | Chandra Mondal et al. |

(Continued)

OTHER PUBLICATIONS

Extended European Search Report for EP Patent Application No. 21200096.2; 7 pages; dated Feb. 22, 2022.

*Primary Examiner* — Maria El-Zoobi
(74) *Attorney, Agent, or Firm* — Kowert, Hood, Munyon, Rankin & Goetzel, P.C.

(57) ABSTRACT

Apparatuses, systems, and methods for emergency communications (e.g., voice calls and/or SMS messages) for UE's without cellular coverage (e.g., in non-cellular coverage). A UE may establish, while out of range of cellular service, a peer-to-peer communication session with a relay UE using a channel in an unlicensed frequency band. The UE may transmit, using the peer-to-peer communication session, an emergency notification to the relay UE. The emergency notification may include an approximate location of the UE. Further the UE may communicate with a Public Safety Answering Point (PSAP), where the communications may be relayed between the UE and the PSAP by the relay UE. The approximate location of the UE may be based, at least in part, on a location of the relay UE and determining the approximate location of the UE may include performing a ranging procedure with the relay UE.

20 Claims, 19 Drawing Sheets

(51) Int. Cl.
*H04W 4/80* (2018.01)
*H04W 76/14* (2018.01)
*H04W 76/50* (2018.01)
*H04W 92/18* (2009.01)

(58) Field of Classification Search
USPC .................................................. 455/404.1
See application file for complete search history.

(56) References Cited

U.S. PATENT DOCUMENTS

2012/0252398 A1* 10/2012 Jacobs ............... H04B 7/15507
                                                           455/404.1
2013/0272195 A1    10/2013 Chu et al.
2018/0124584 A1*   5/2018 Venkatraman ........ H04W 76/14
2021/0297221 A1*   9/2021 Lee ...................... H04L 1/1812

\* cited by examiner

EMERGENCY COMMUNICATION IN NON-CELLULAR COVERAGE

PRIORITY DATA

This application claims benefit of priority to U.S. Provisional Application Ser. No. 63/086,470, titled "Emergency Communication in Non-cellular Coverage", filed Oct. 1, 2020, which is hereby incorporated by reference in its entirety as though fully and completely set forth herein.

FIELD

The invention relates to wireless communications, and more particularly to apparatuses, systems, and methods for emergency communications (e.g., voice calls and/or SMS messages) for UE's without cellular coverage (e.g., in non-cellular coverage).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for emergency communications (e.g., voice calls and/or SMS messages) for UE's without cellular coverage (e.g., in non-cellular coverage).

For example, in some embodiments, a user equipment device (UE), such as UE 106, may be configured to establish, while out of range of cellular service, a peer-to-peer communication session with a relay UE using a channel in an unlicensed frequency band. The UE may be configured to transmit, using the peer-to-peer communication session, an emergency notification to the relay UE. The emergency notification may include an approximate location of the UE. Further the UE may be configured to communicate with a Public Safety Answering Point (PSAP), where the communications may be relayed between the UE and the PSAP by the relay UE. In some embodiments, the approximate location of the UE may be based, at least in part, on a location of the relay UE. In some embodiments, determining the approximate location of the UE may include performing a ranging procedure with the relay UE.

As another example, in some embodiments, a UE, such as UE 106, may be configured to receive, from a remote (or host) UE, an emergency notification using a peer-to-peer communication session established between the UE and remote UE. In some embodiments, the emergency notification may include an approximate location of the remote UE and the remote UE may be out of range of cellular service. The UE may be configured to establish, on behalf of the remote UE, an SOS APN with the network (e.g., with a function of the network), based, at least in part, on the approximate location of the remote UE. The UE may be configured to relay communications between the remote UE and a PSAP, where the PSAP may be selected by the network based, at least in part, on the approximate location of the remote UE. In some embodiments, a request to establish the peer-to-peer communication session using an unlicensed frequency band may be received from the remote UE on an unlicensed frequency band. In some embodiments, the approximate location of the remote UE may be based, at least in part, on a location of the UE. In some embodiments, determining the approximate location of the remote UE may include performing a ranging procedure with the UE.

As a further example, a function of a core network may be configured to receive, from a relay UE, a request to establish an SOS APN for a remote UE, where the request may include at least an approximate location of the remote UE. In some embodiments, the remote UE may be out of range of cellular service. The function of the core network, after establishment of the SOS APN for the remote UE, may be configured to route, based, at least in part, on the approximate location of the remote UE, traffic from the remote UE to a Public Safety Answering Point (PSAP) with a coverage area that includes the approximate location of the remote UE. In some embodiments, the approximate location of the remote UE may be based, at least in part, on a location of the relay UE.

As another example, a PSAP may be configured to receive, from a function of a core network, a request to establish an IMS session based, at least in part, on an SOS APN for a remote UE. The request may include at least an approximate location of the remote UE. In some embodiments, the remote UE may out of range of cellular service. The PSAP may be configured to perform emergency communications with the remote UE via a relay UE serviced by the core network. In some embodiments, the approximate location of the remote UE may be determined based, at least in part, on a location of the relaying UE.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
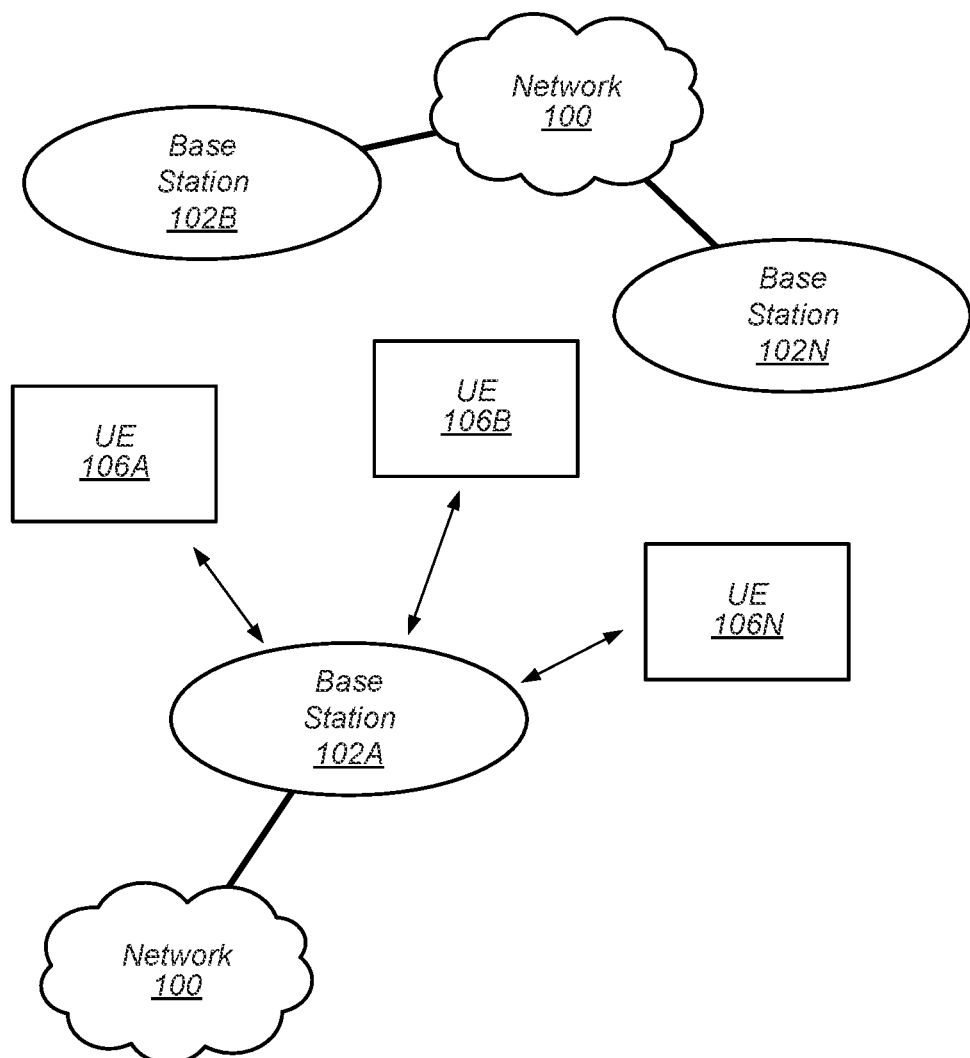
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
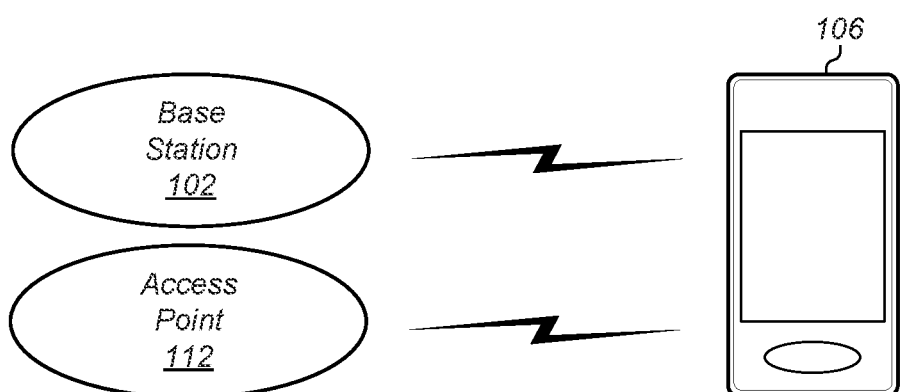
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
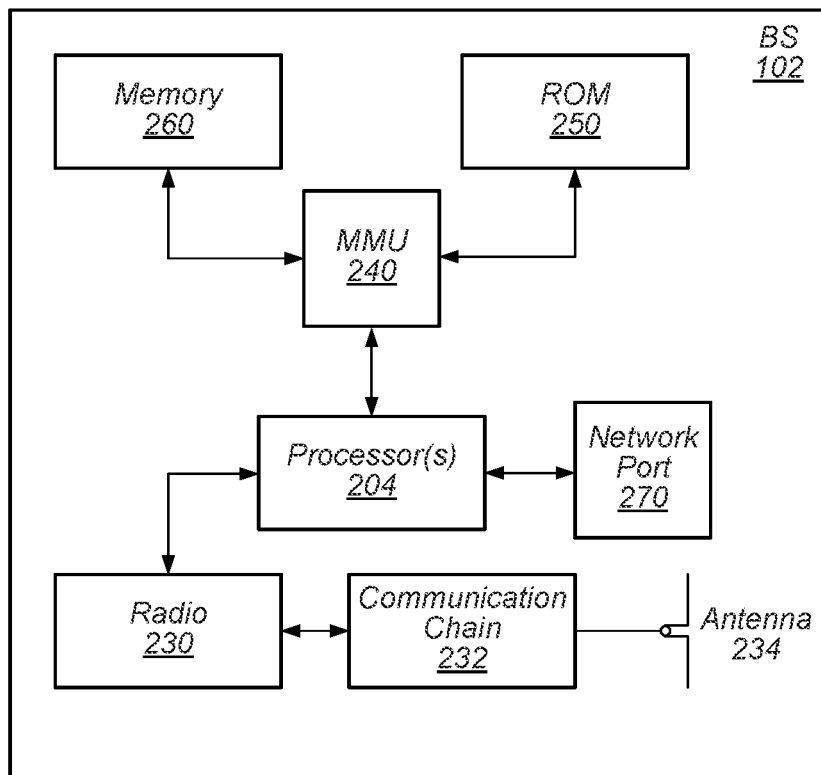
FIG. 2 illustrates an example block diagram of a base station, according to some embodiments.

FIG. 2: Block Diagram of a Base Station

Figure 3:
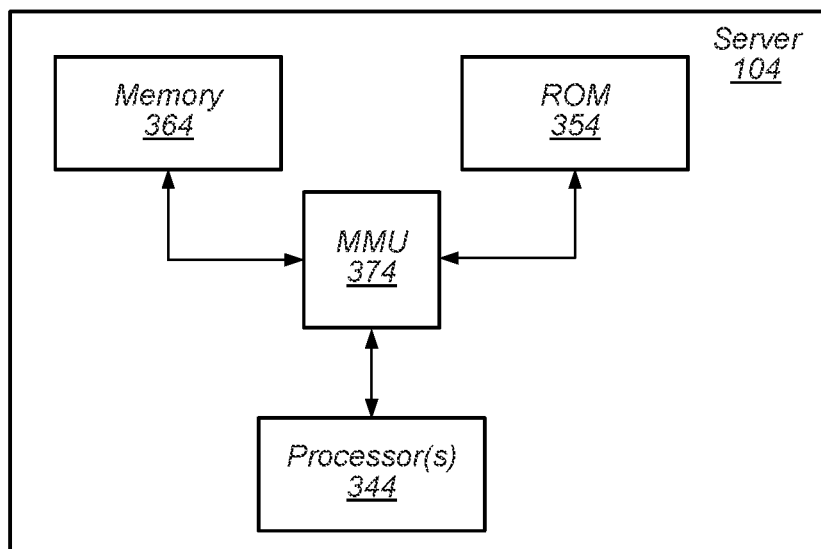
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
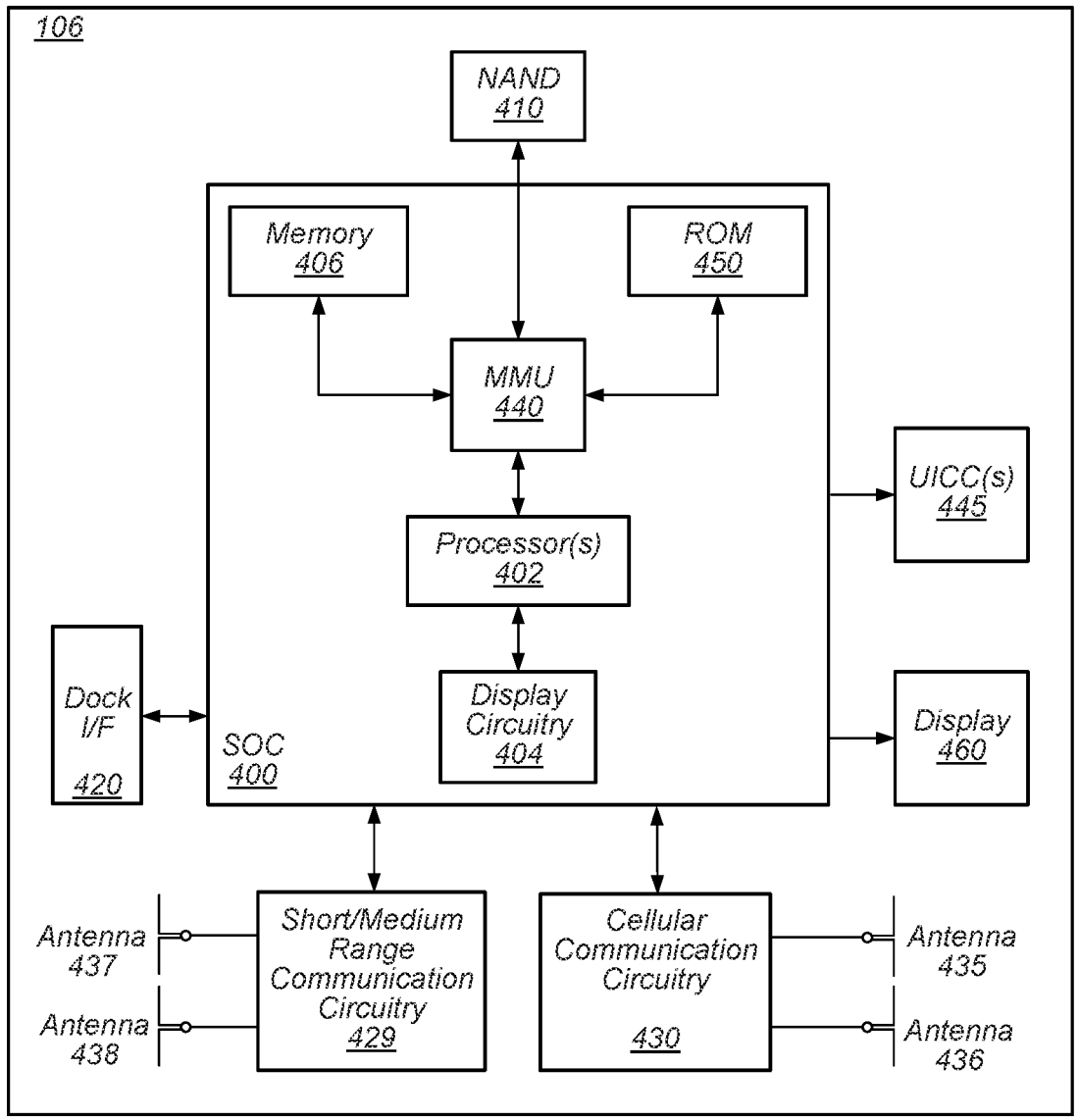
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus the SIM(s) may be one or more removable smart cards (such as UICC cards, which are sometimes referred to as "SIM cards"), and/or the SIMS 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMS, two removable SIMs, or a combination of one embedded SIMs and one removable SIMS. Various other SIM configurations are also contemplated.

As noted above, in some embodiments, the UE 106 may include two or more SIMs. The inclusion of two or more SIMS in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMS in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for emergency communications (e.g., voice calls and/or SMS messages) for UE's without cellular coverage (e.g., in non-cellular coverage), as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
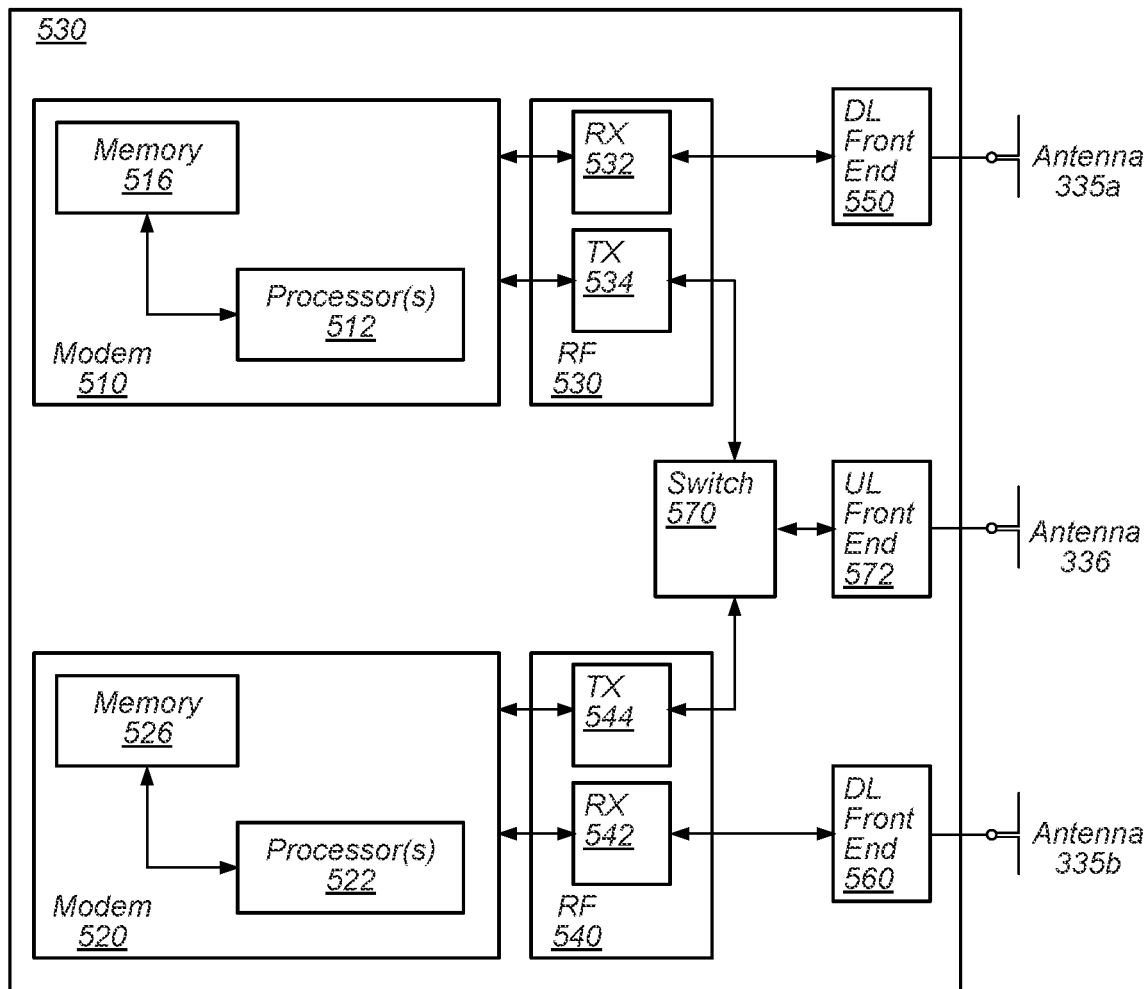
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods emergency communications (e.g., voice calls and/or SMS messages) for UE's without cellular coverage (e.g., in non-cellular coverage), as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
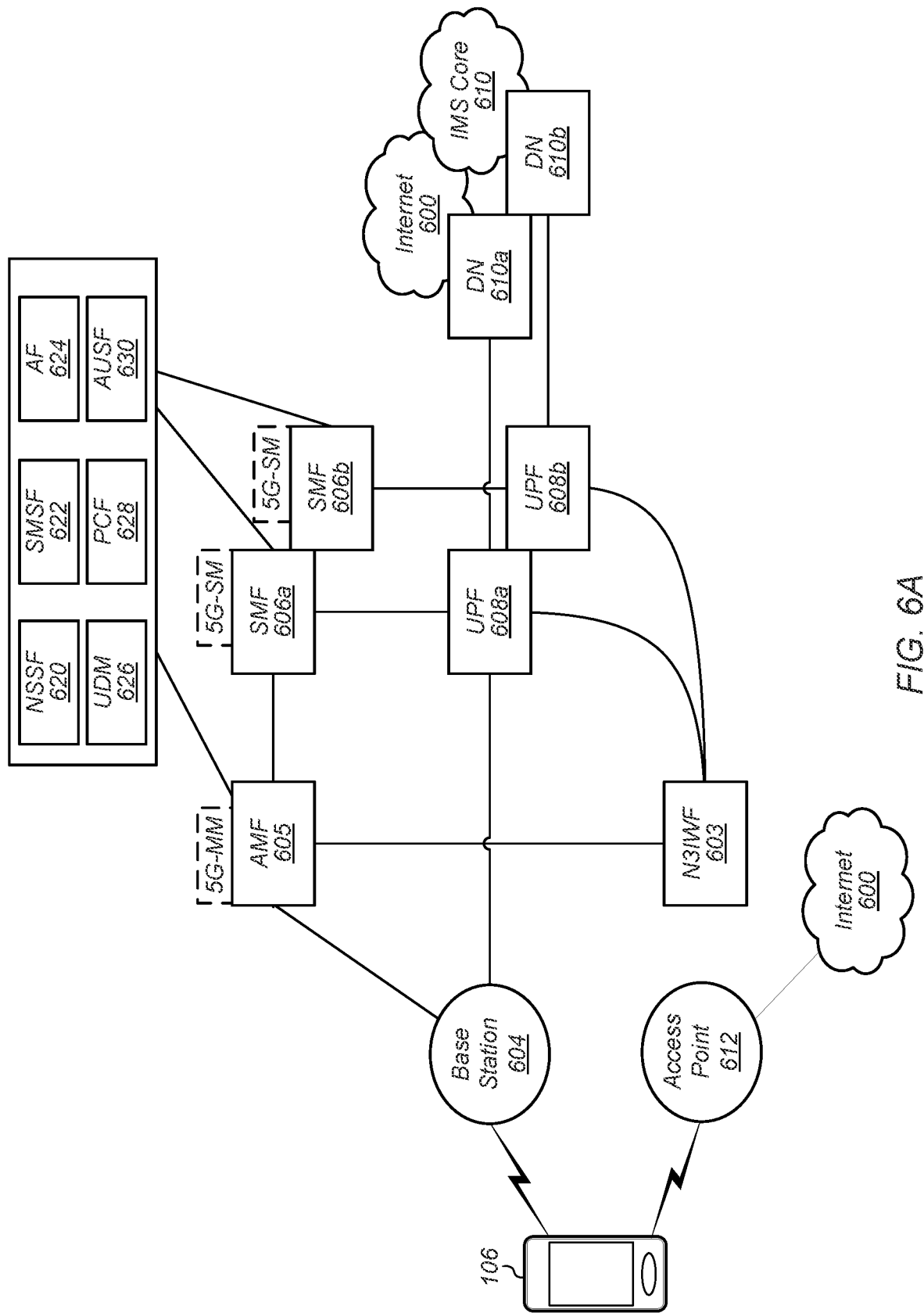
FIG. 6A illustrates an example of a 5G network architecture that incorporates both 3GPP (e.g., cellular) and non-3GPP (e.g., non-cellular) access to the 5G CN, according to some embodiments.
Figure 6B:
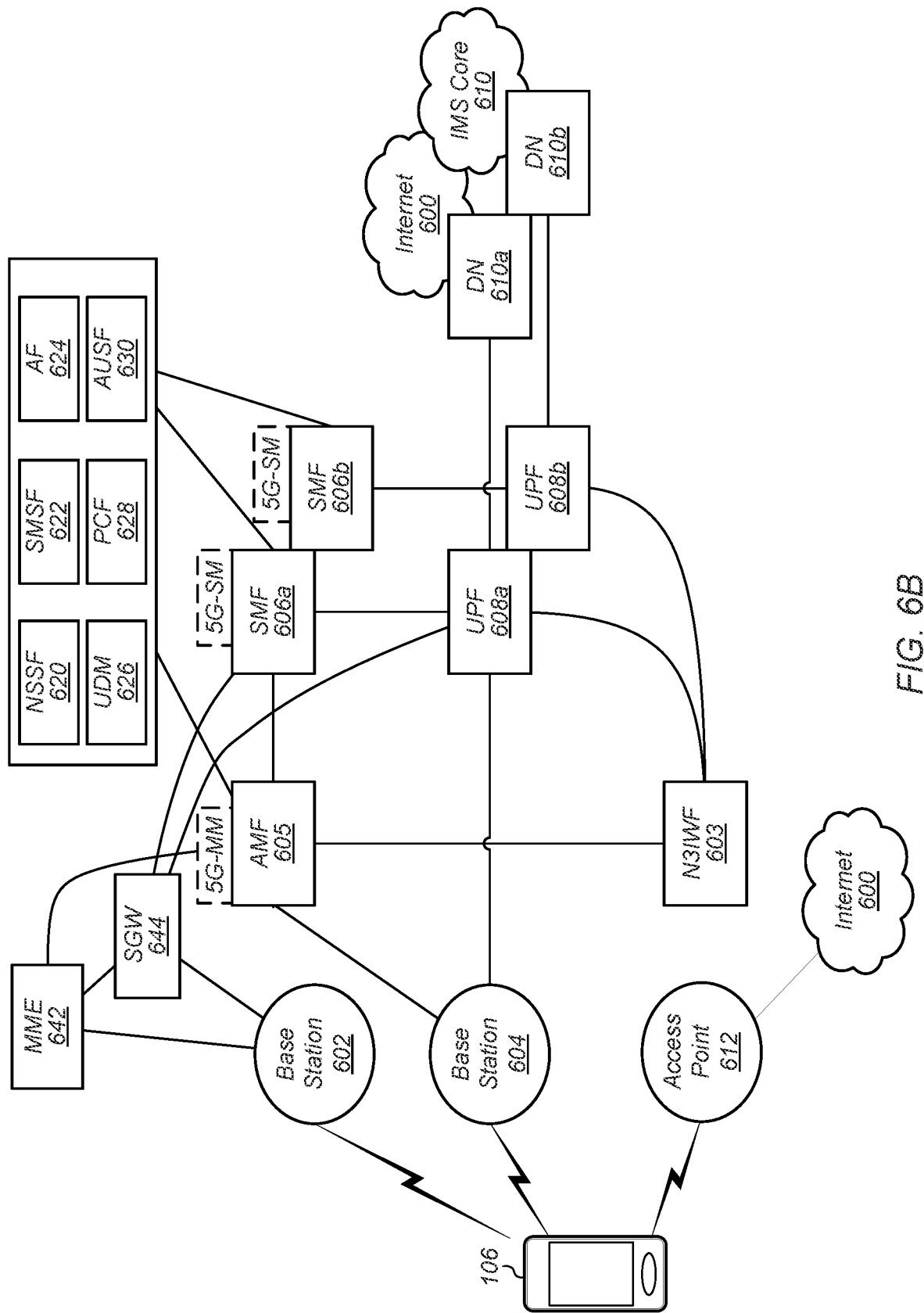
FIG. 6B illustrates an example of a 5G network architecture that incorporates both dual 3GPP (e.g., LTE and 5G NR) access and non-3GPP access to the 5G CN, according to some embodiments.
Figure 7:
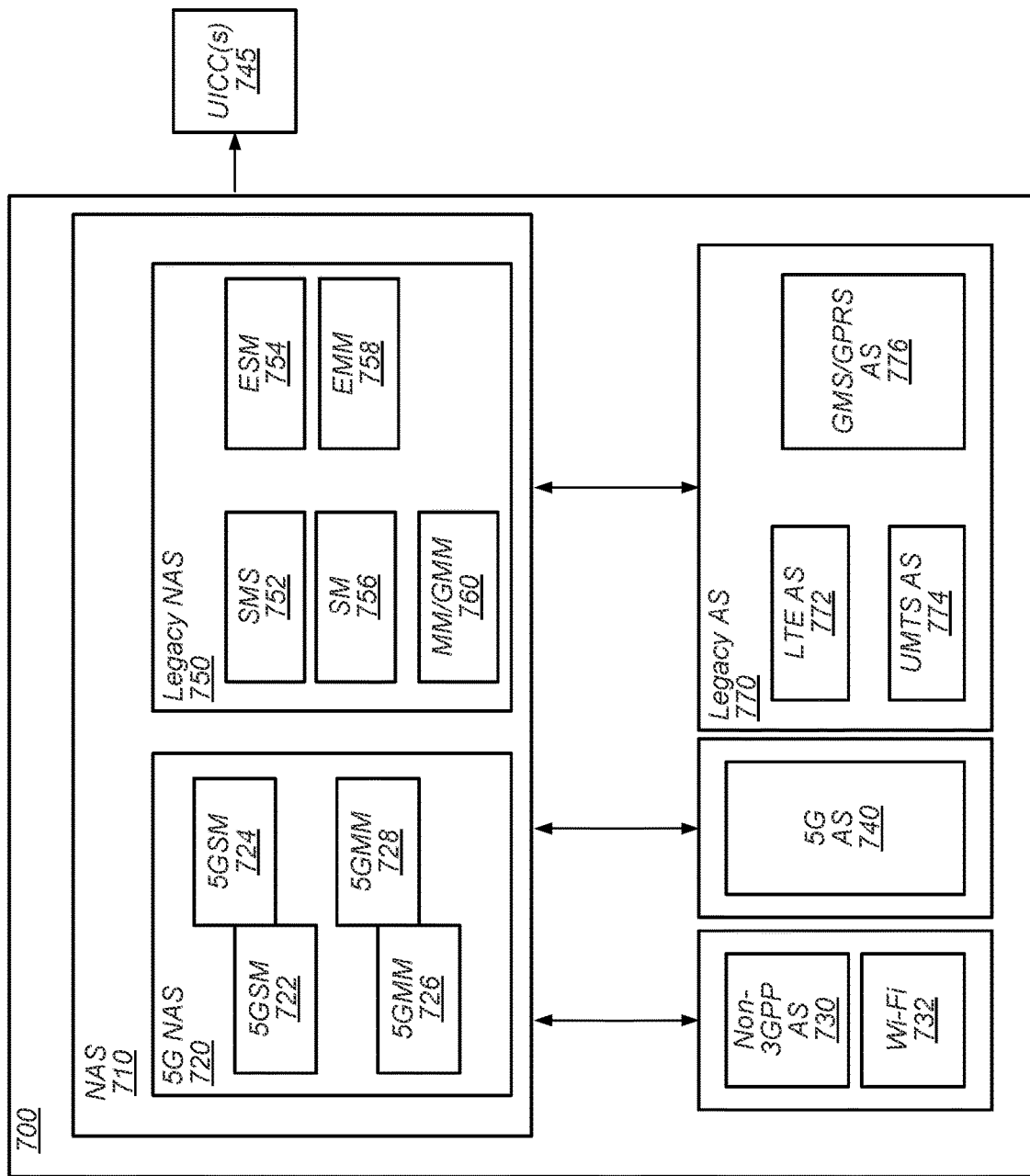
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP interworking function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above described network entities may be configured to perform methods to improve security checks in a 5G NR network, including mechanisms emergency communications (e.g., voice calls and/or SMS messages) for UE's without cellular coverage (e.g., in non-cellular coverage), e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods emergency communications (e.g., voice calls and/or SMS messages) for UE's without cellular coverage (e.g., in non-cellular coverage), e.g., as further described herein.

Emergency Communications in Non-Cellular Coverage

In current cellular communication systems, a user equipment device (UE), when in an out-of-coverage scenario (e.g., without cellular service and/or in non-cellular coverage), may be unable to make an emergency communication (e.g., a call and/or a text, such as a short message service (SMS) message) to 911 and/or receive wireless emergency alerts. However, since all 3GPP authorized handheld users have the opportunity to reach emergency services and/or to receive emergency alert messages. Thus, in current implementations, 3GPP ProSe (e.g., peer-to-peer communications such as D2D and/or V2X) allows emergency broadcasting for public safety (e.g., to allow an out-of-coverage UE to receive emergency alerts from a peer device in coverage). However, an out-of-coverage UE cannot currently use 3GPP ProSe to make an emergency communication.

Figure 8:
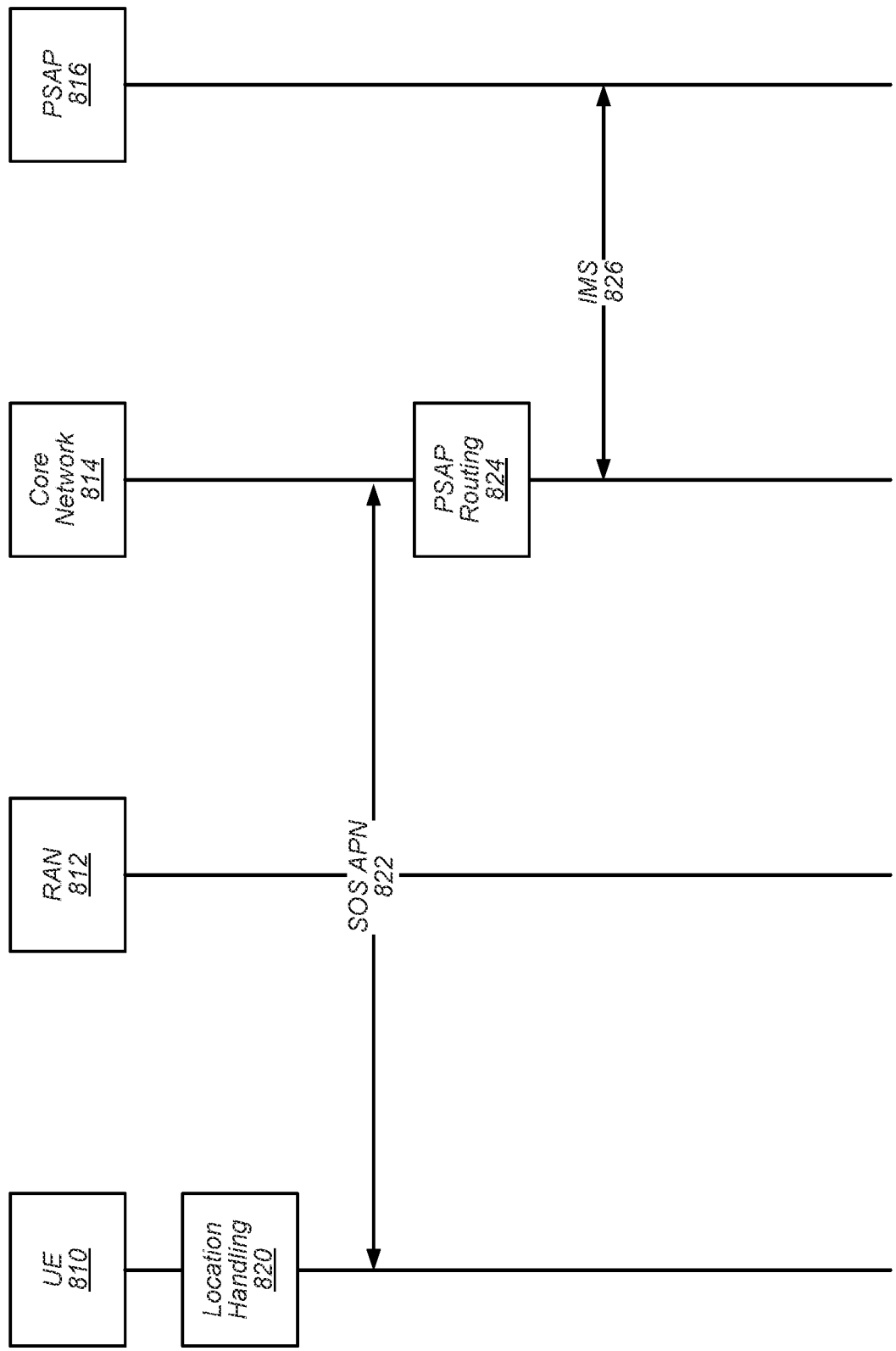
FIG. 8 illustrates an example of signaling for an emergency communication.

In current implementations, as illustrated by FIG. 8, a UE (e.g., UE 810) may determine its location (e.g., location handling 820) and initiate an emergency communication, e.g., an emergency call to 911. Once the UE dials an emergency number (e.g., 911), which is detected by radio access network 812, an emergency attachment procedure is initiated. The emergency attachment procedure creates and/or allocates a default bearer to an SOS access point name (APN), e.g., such as SOS APN 822, for emergency session initiation protocol (SIP) signaling. Core network 814 may determine, based on the location of the UE, an appropriate Public Safety Answering Point/Public Safety Access Point (PSAP), such as PSAP 816 at PSAP routing 824. Core network 814 may establish an IMS session 826 with PSAP 816, e.g., based on the SOS APN. The UE may accomplish SIP emergency registration towards a Proxy-Call Session Control Function (P-CSCF) of core network 814 that is dedicated for emergency operations. The P-CSCF (in addition to other tasks) establishes an RTP path toward PSAP 816 and the emergency SIP session is established. Once the UE or PSAP ends the emergency SIP session, the PSAP may optionally originate a callback session to the UE over a non-emergency P-CSCF.

Embodiments described herein provide systems, methods, and mechanisms for an out-of-coverage UE to establish emergency communications with a PSAP. In some embodiments, an emergency channel may be introduced to allow location and emergency information to be transmitted between peer UEs, e.g., in instances in which a first UE is out-of-service (e.g., a client, remote, and/or host UE) and a second UE (e.g., a relay UE) is in service. In some embodiments, the emergency channel may be used for emergency message forwarding (e.g., an in-service UE may function as a relay (e.g., a relay UE) for an out-of-service UE to forward an emergency message from the out-of-service UE to a network) and/or for emergency notification forwarding (e.g., an in-service UE may function as a relay for an out-of-service UE to forward an emergency notification from a network to the out-of-service UE). In some embodiments, existing side-link (e.g., 3GPP PC5 based) communication channels may be used to allow location and emergency information to be transmitted between peer UEs, e.g., in instances in which a first UE is out-of-service and a second UE is in service. In some embodiments, an out-of-service UE may perform a discovery procedure prior to selecting an in-service UE for relaying an emergency message. In some embodiments, a location enhancement procedure between the out-of-service UE and in-service UE may be performed to improve location accuracy of the out-of-service UE. In some embodiments, the in-service UE may provide a location confidence factor to a PSAP when communicating the emergency message on behalf of the out-of-service UE. In some embodiments, a third-party cloud server may establish a datapath with the out-of-service UE via the in-service UE (e.g., via the relay UE). In some embodiments, the datapath may allow the out-of-service UE to communicate, via the relay UE, information associate with user health and user location as well as information from UE sensors (e.g., such as fall detection information, location information, and so forth).

In some embodiments, as indicated above, an emergency channel may be introduced to allow location and emergency information to be transmitted between peer UEs, e.g., in instances in which a first UE (e.g., a client, remote, and/or host UE) is out-of-service and a second UE (e.g., a relay UE) is in service. In such embodiments, all UEs may listen and/or visit the emergency channel periodically, e.g., at least once every two to three seconds based on current battery consumption and/or current power levels. In some embodiments, when in a battery and/or power conservation state, a UE may listen and/or visit the emergency channel less often, e.g., once every five to ten seconds and/or longer intervals. In some embodiments, the emergency channel may be enabled on an unlicensed band of the frequency spectrum. In some embodiments, the emergency channel may support any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the emergency channel may be region specific. In some embodiments, the emergency channel may be standardized worldwide. In some embodiments, the emergency channel may carry emergency messages containing at least location information and/or an indication of a type of an emergency. In some embodiments, the emergency channel may be implemented as part of the 3GPP PC5 communication protocol as a separate physical channel and/or as an embedded into broadcasting channel (e.g., such as a physical sidelink broadcast channel (PSBCH)). In some embodiments, the emergency channel may be implemented as a proprietary solution that works only between devices of a particular manufacturer, a particular set of manufactures, a particular carrier, and/or a particular set of carriers. In some embodiments, the emergency channel may include region specific resource configurations.

In some embodiments, emergency message forwarding may be in both directions, e.g., from a remote (e.g., client and/or host) UE to a network via a relay UE and/or from the network to the remote UE via the relay UE. For example, in some embodiments, a remote UE may be seeking help and an emergency message may be forwarded, via a relay UE, to emergency services. As another example, a relay UE may receive an emergency notification (e.g., such as a Commercial Mobile Alert System (CMAS) notification and/or a Wireless Emergency Alerts (WEA) notification) from a network and forward the emergency notification to a remote UE. In some embodiments, a remote UE may broadcast an emergency message via an emergency channel requesting emergency message forwarding and a relay UE that is in proximity to the remote UE may respond to the request and forward the emergency message to emergency services. In such embodiments, no further communication may occur between the remote UE and the relay UE. In other words, no unicast communication may be established between the remote UE and the relay UE. In some embodiments, a remote UE may seek for a potential relay UE by sending emergency beacon. Upon reception, the relay UE may respond to the emergency beacon and the remote UE and relay UE may synchronize and establish unicast communications.

In some embodiments, emergency channel forwarding may occur as a background functionality at a relay UE, e.g., the relay UE may autonomously forward emergency channel data without user intervention. In some embodiments, emergency notification forwarding on the emergency channel may be a background function at a relay UE, however, emergency message forwarding on the emergency channel may require user intervention. In some embodiments, emergency channel forwarding at a relay UE may require user intervention, e.g., such as a user opting into emergency channel forwarding and/or a user determining on a case by case basis whether to allow emergency channel forwarding.

Figure 9:
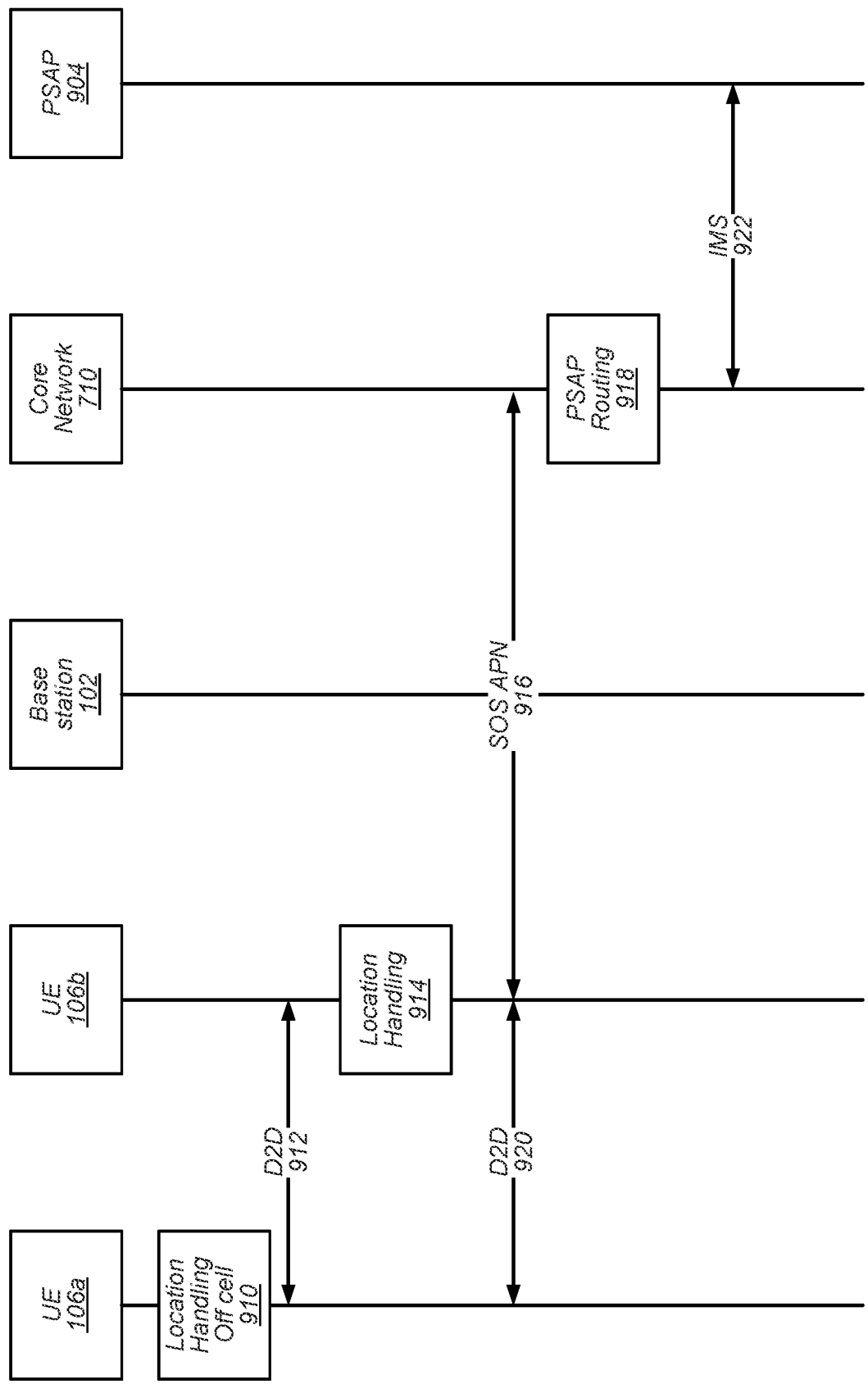
FIG. 9 illustrates an example of signaling for an out-of-service UE to complete an emergency communication via an in-service UE, according to some embodiments.

FIG. 9 illustrates an example of signaling for an out-of-service UE to complete an emergency communication via an in-service UE, according to some embodiments. The signaling shown in FIG. 9 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a remote (client and/or host) UE, e.g., UE 106a, may be out-of-service and a user of the remote UE may experience an emergency condition. At 910, the remote UE may determine an approximate location, e.g., based at least in part on global positioning system (GPS) data and/or other available location information. At 912, the remote UE may establish device-to-device (D2D) communication with a relay UE, e.g., UE 106b. During D2D communication, the remote UE may provide information associated with the emergency condition to the relay UE. For example, the remote UE may provide an indication of a type of emergency, the approximate location of the remote UE, and/or other information associated with the emergency condition. In some embodiments, the D2D communication may be established on an unlicensed band of the frequency spectrum. In some embodiments, the D2D communication may be established based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the D2D communication may be established based on and/or in conjunction with 3GPP PC5 communication protocol. In some embodiments, the D2D communication may be established using an emergency channel, e.g., as described herein.

At 914, the relay UE may determine whether to use the approximate location supplied by the remote UE and/or whether to determine a confidence metric associated with the approximate location of the remote UE. In other words, the relay may determine whether to perform a procedure to enhance an estimation of the location of the remote UE, e.g., as further described herein. In some embodiments, the relay UE and remote UE may perform a ranging procedure to aid in determination of a location of the remote UE. Further, the relay UE may determine client location information to share with a network, e.g., such as the approximate location of the remote UE, a confidence metric associated with the approximate location of the remote UE, and/or results of a ranging procedure with the remote UE.

For example, in some embodiments, a relay UE, e.g., such as UE 106 and/or UE 106b, may perform a location enhancement and/or calculate a confidence metric for a location provided by a remote (e.g., client, host, and/or target) UE, e.g., such as UE 106 and/or UE 106a. As an example, in some embodiments, the remote UE may request the relay UE's serving cell and location (e.g., latitude, longitude, and/or height (e.g., relative to sea level) with uncertainty. Then, the remote UE may calculate a range between UE's using a two-sided round-trip time (RTT). Then, the remote UE may use the range between the UE's and the relay UE's location data to calculate an approximate location of the remote UE. In some embodiments, as the UEs move relative to one another, range and position data can be updated periodically to aid in sending updates to a PSAP, alerts to a third-party cloud server, and/or to detect proximity and edge conditions for call and packet data link quality. In some embodiments, users of the UE may exchange and/or share their positions, health information, sensor data using over-the-top (OTT) services once data paths are established in parallel with a voice path, e.g., as described herein. In some embodiments, the remote UE may use the location of the relay UE to aid other positioning sources such as GNSS and reduce search and position calculation time, thereby saving critical battery resources in out-of-service conditions. In some embodiments, the remote UE may send location information (latitude, longitude, height, uncertainty, and/or confidence level to the relay UE. In some embodiments, the relay UE may then pass the location information of the remote UE to the core network, e.g., by acting as a layer 2 (L2) bridge between the remote UE and the core network. The core network may then pass the location information of the remote UE to the PSAP and the PSAP may rely on the location from remote UE.

The relay UE may then initiate an emergency attachment procedure on behalf of the remote UE with the network, e.g., with base station 102. The emergency attachment procedure may create and/or allocate a default bearer to an SOS APN, e.g., such as SOS APN 916, for emergency session initiation protocol (SIP) signaling. Core network 610 may determine, based on location information of the remote UE (e.g., as provided by the relay UE), an appropriate Public Safety Answering Point/Public Safety Access Point (PSAP), such as PSAP 904 at PSAP routing 918. Core network 610 may establish an IMS session 922 with PSAP 904, e.g., based on the SOS APN. Additionally, the core network 610 may route an IMS emergency to PSAP 904. The relay UE may accomplish SIP emergency registration towards a Proxy-Call Session Control Function (P-CSCF)/Emergency-Call Session Control Function (E-CSCF) of core network 610 that is dedicated for emergency operations. The P-CSCF/E-CSCF (in addition to other tasks) may facilitate establishment of an RTP path toward PSAP 904 and the emergency SIP session is established. The relay UE may then relay communications with PSAP 904 to the remote UE via D2D communications 920, e.g., using the same communication technology used to establish the D2D communication at 912.

Figure 10A:
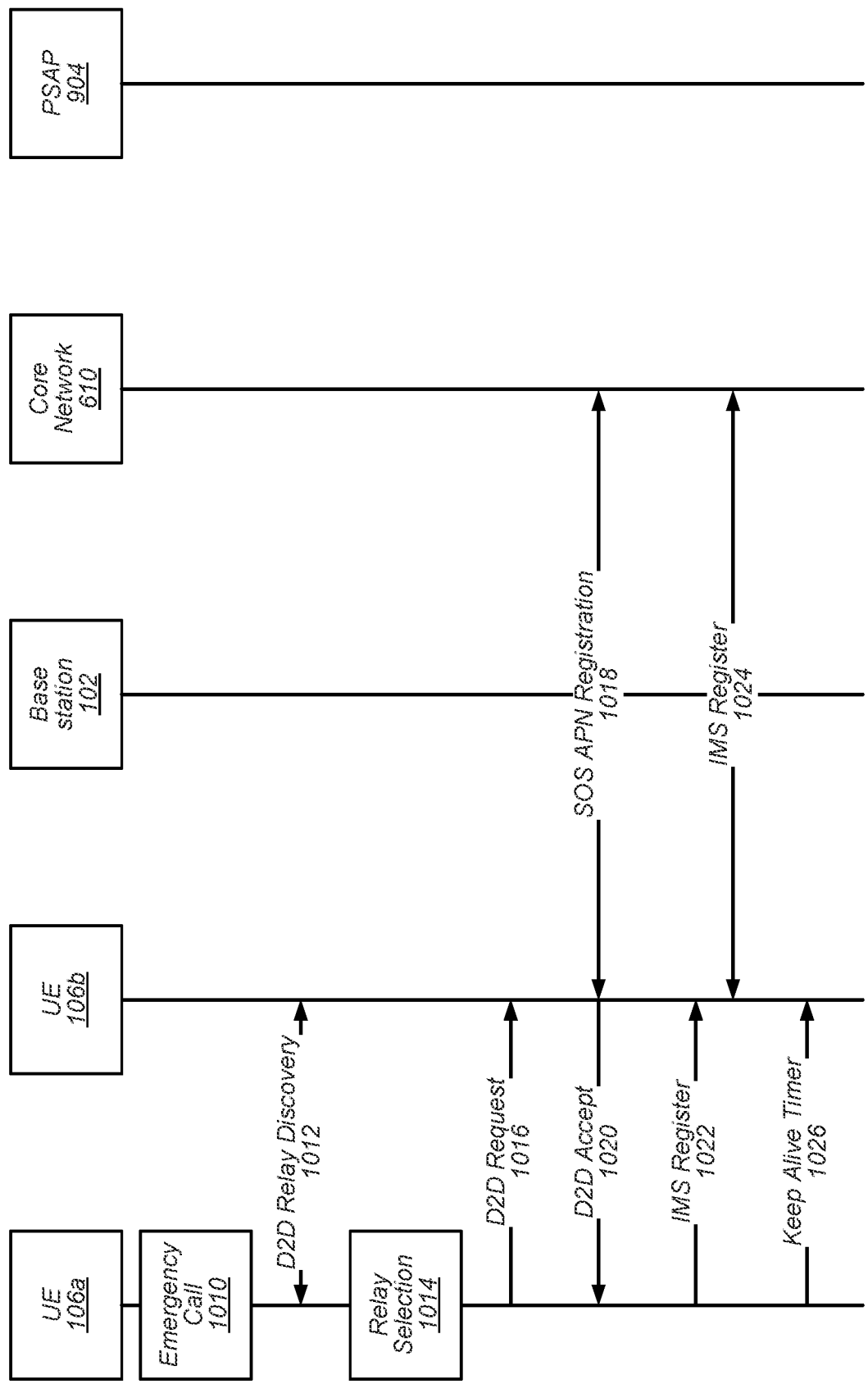
FIG. 10A illustrates an example of signaling for an out-of-service UE to complete an emergency communication via an in-service UE using a layer 3 (L3) relay, according to some embodiments.
Figure 10B:
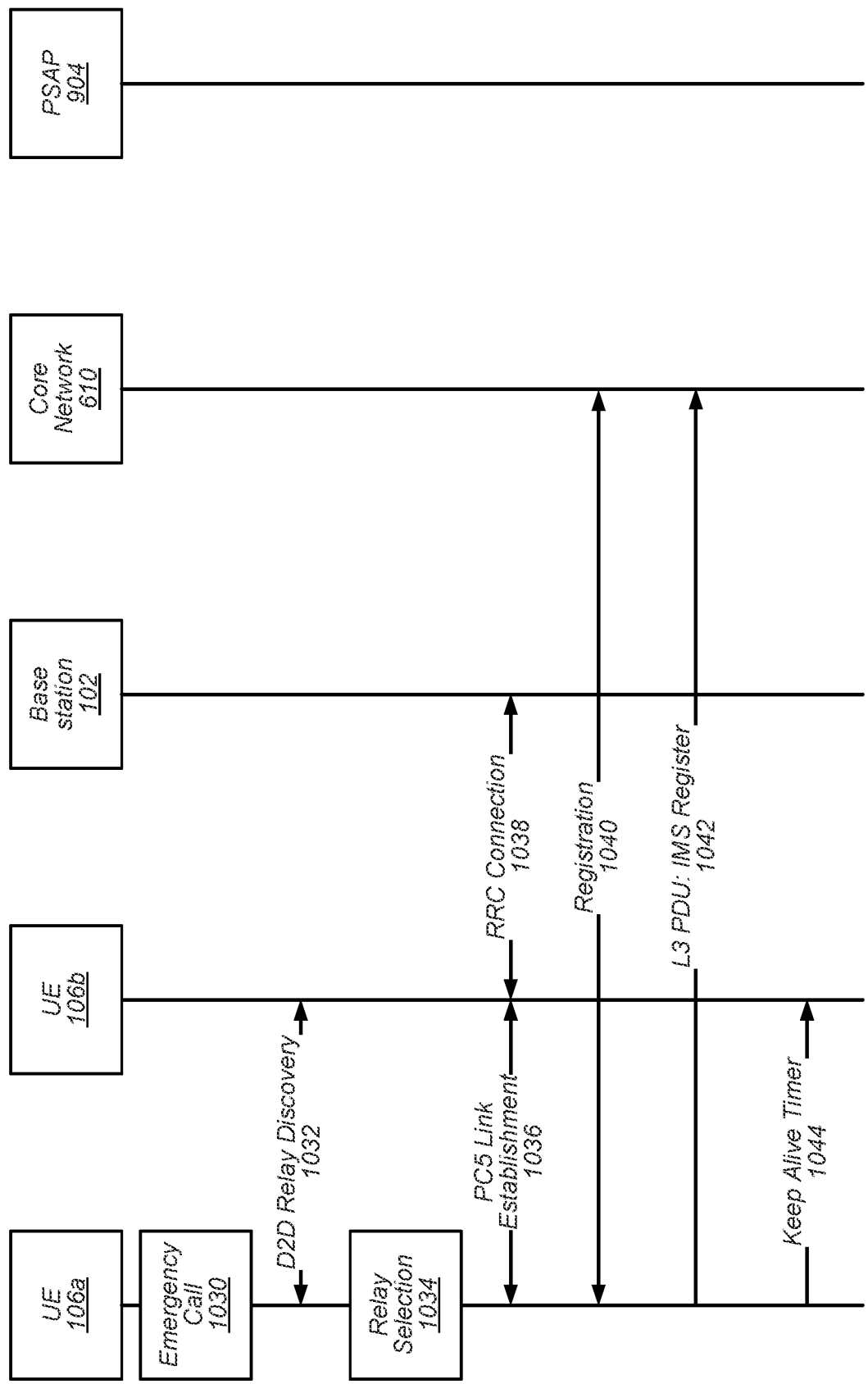
FIG. 10B illustrates an example of signaling for an out-of-service UE to complete an emergency communication via an in-service UE using a layer 2 (L2) relay, according to some embodiments.

FIGS. 10A and 10B illustrate further examples of signaling for an out-of-service UE to complete an emergency communication via an in-service UE, according to some embodiments. In particular, FIG. 10A illustrates an example of signaling for an out-of-service UE to complete an emergency communication via an in-service UE using a layer 3 (L3) relay, according to some embodiments and FIG. 10B illustrates an example of signaling for an out-of-service UE to complete an emergency communication via an in-service UE using a layer 2 (L2) relay, according to some embodiments.

Turning to FIG. 10A, the signaling shown in FIG. 10A may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a remote (e.g., client and/or host) UE, e.g., UE 106a, may be out-of-service and a user of the remote UE may experience an emergency condition. Thus, the remote UE may initiate an emergency call at 1010. In some embodiments, upon experiencing the emergency condition, the remote UE may determine an approximate location, e.g., based at least in part on global positioning system (GPS) data and/or other available location information. At 1012, the remote UE may initiate device-to-device (D2D) relay discovery. The remote UE may discover one or more potential relay UEs, such as UE 106b.

At 1014, the remote UE may select a relay UE based on the discovered potential relay UEs. In some embodiments, selection of a relay UE may be based on one or more factors, such as signal strength, a capability indication from a relay UE indicating support (and/or non-support) of emergency relay functionality. In some embodiments, the D2D relay discovery may be performed on an unlicensed band of the frequency spectrum. In some embodiments, the D2D relay discovery may be performed based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the D2D relay discovery may be performed based on and/or in conjunction with 3GPP PC5 communication protocol. In some embodiments, the D2D relay discovery may be performed using an emergency channel, e.g., as described herein. In some embodiments, during D2D relay discovery, the remote UE may provide information associated with the emergency condition to the potential relay UEs. For example, the remote UE may provide an indication of a type of emergency, the approximate location of the remote UE, and/or other information associated with the emergency condition.

At 1016, upon selecting UE 106b as the relay UE, the remote UE may send a D2D request message. In some embodiments, the D2D request message may be transmitted on an unlicensed band of the frequency spectrum. In some embodiments, the D2D request message may be transmitted based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the D2D request message may be transmitted based on and/or in conjunction with 3GPP PC5 communication protocol. In some embodiments, the D2D request message may be transmitted using an emergency channel, e.g., as described herein. In some embodiments, the D2D request message may include information associated with the emergency condition to the potential relay UEs. For example, the remote UE may provide an indication of a type of emergency, the approximate location of the remote UE, and/or other information associated with the emergency condition.

At 1018, the remote UE may then initiate an emergency attachment procedure on behalf of the remote UE with the network, e.g., with base station 102. The emergency attachment procedure may create and/or allocate a default bearer to an SOS APN, e.g., such as SOS APN 1018, for emergency session initiation protocol (SIP) signaling. Core network 610 may determine, based on location information of the remote UE (e.g., as provided by the relay UE), an appropriate Public Safety Answering Point/Public Safety Access Point (PSAP), such as PSAP 904. The relay UE may accomplish SIP emergency registration towards a Proxy-Call Session Control Function (P-CSCF) of core network 610. The P-CSCF (in addition to other tasks) may facilitate establishment of an RTP path toward PSAP 904 and the emergency SIP session is established.

At 1020, the relay UE may accept the D2D request and notify the remote UE of acceptance of the D2D request. Additionally, the relay UE may provide the remote UE with information associated with the remote UE registering with the core network 610. At 1022, the remote UE may send an IMS registration request message to the relay UE, which the relay UE may then forward to core network 610. At 1024, the relay UE may perform IMS registration with the core network 610 on behalf of the remote UE. Further, at 1026, the remote UE may send a keep alive timer D2D message to the relay UE, e.g., to avoid timeout of the emergency call.

Turning to FIG. 10B, the signaling shown in FIG. 10B may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a remote (e.g., client and/or host) UE, e.g., UE 106a, may be out-of-service and a user of the remote UE may experience an emergency condition. Thus, the remote UE may initiate an emergency call at 1030. In some embodiments, upon experiencing the emergency condition, the remote UE may determine an approximate location, e.g., based at least in part on global positioning system (GPS) data and/or other available location information. At 1032, the remote UE may initiate device-to-device (D2D) relay discovery. The remote UE may discover one or more potential relay UEs, such as UE 106b.

At 1034, the remote UE may select a relay UE based on the discovered potential relay UEs. In some embodiments, selection of a relay UE may be based on one or more factors, such as signal strength, a capability indication from a relay UE indicating support (and/or non-support) of emergency relay functionality. In some embodiments, the remote UE may select a relay UE ignoring a check of public land mobile network (PLMN) (and/or PLMNs) that the relay UE may be advertising. In some embodiments, the D2D relay discovery may be performed on an unlicensed band of the frequency spectrum. In some embodiments, the D2D relay discovery may be performed based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the D2D relay discovery may be performed based on and/or in conjunction with 3GPP PC5 communication protocol. In some embodiments, the D2D relay discovery may be performed using an emergency channel, e.g., as described herein. In some embodiments, during D2D relay discovery, the remote UE may provide information associated with the emergency condition to the potential relay UEs. For example, the remote UE may provide an indication of a type of emergency, the approximate location of the remote UE, and/or other information associated with the emergency condition.

At 1036, upon selecting UE 106b as the relay UE, the remote UE and the relay UE may establish a D2D communication session based on 3GPP PC5 protocol. Thus, the relay UE and remote UE may establish a PC5 link. At 1038, the relay UE may perform radio resource connection establishment (RRC) with a base station, such as base station 102. In some embodiments, the establishment of the D2D communication session may include the remote UE sharing information associated with the emergency condition with the relay UE. For example, the remote UE may provide an indication of a type of emergency, the approximate location of the remote UE, and/or other information associated with the emergency condition.

At 1040, the remote UE, via the relay UE, may then initiate an emergency attachment procedure (e.g., including registration of the remote UE on the network) with the network, e.g., with one or more functions of core network 610. The emergency attachment procedure may create and/or allocate a default bearer to an SOS APN, for emergency session initiation protocol (SIP) signaling. Core network 610 may determine, based on location information of the remote UE (e.g., as provided by the relay UE), an appropriate Public Safety Answering Point/Public Safety Access Point (PSAP), such as PSAP 904. The remote UE may accomplish SIP emergency registration towards a Proxy-Call Session Control Function (P-CSCF) of core network 610. The P-CSCF (in addition to other tasks) may facilitate establishment of an RTP path toward PSAP 904 and the emergency SIP session is established.

At 1042, the remote UE, via the relay UE, may perform IMS registration with the core network 610. Further, at 1044, the remote UE may send a keep alive timer D2D message to the relay UE, e.g., to avoid timeout of the emergency call.

Figure 11A:
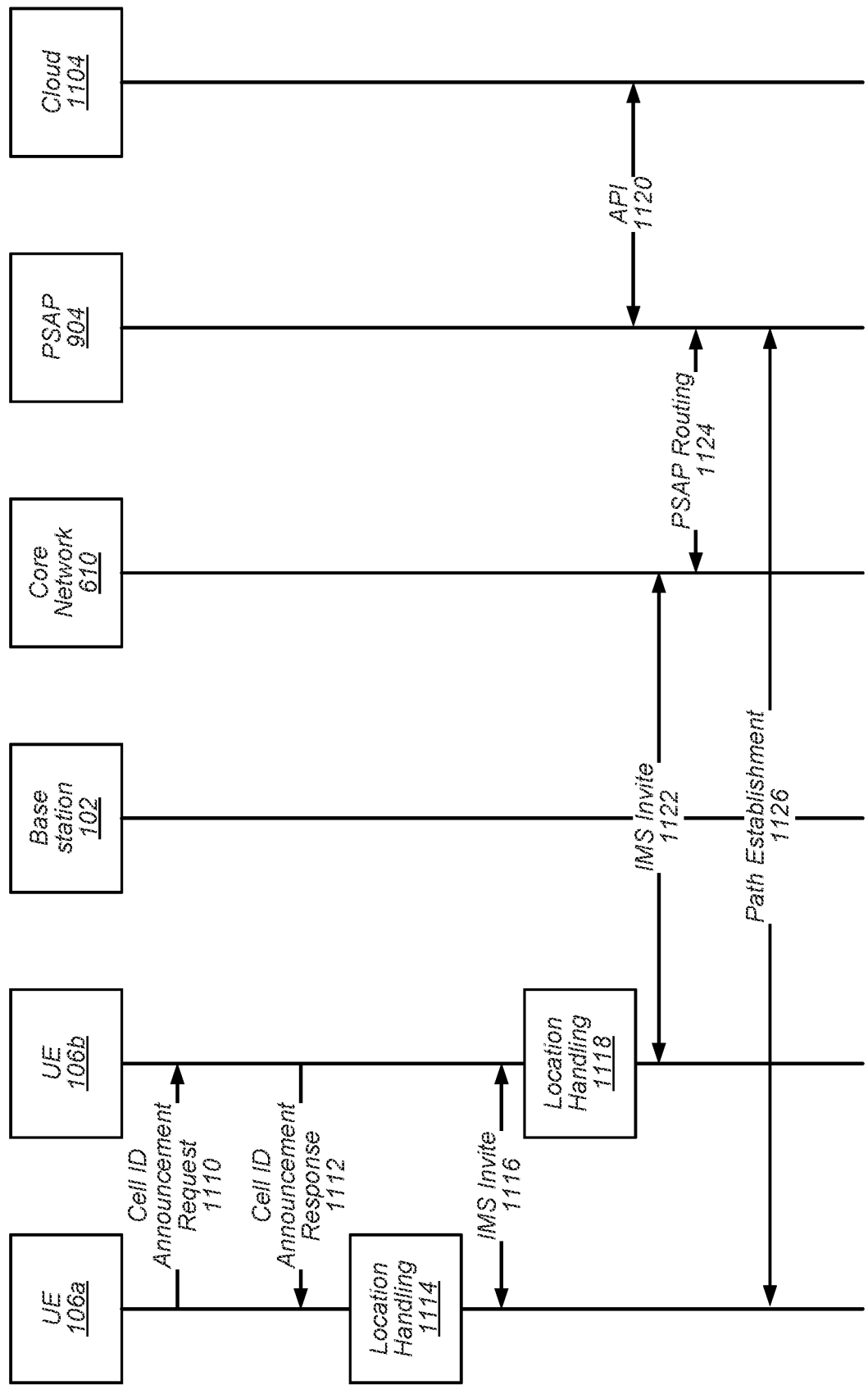
FIG. 11A illustrates an example of signaling for an out-of-service UE to complete an emergency communication via an in-service UE, according to some embodiments.
Figure 11B:
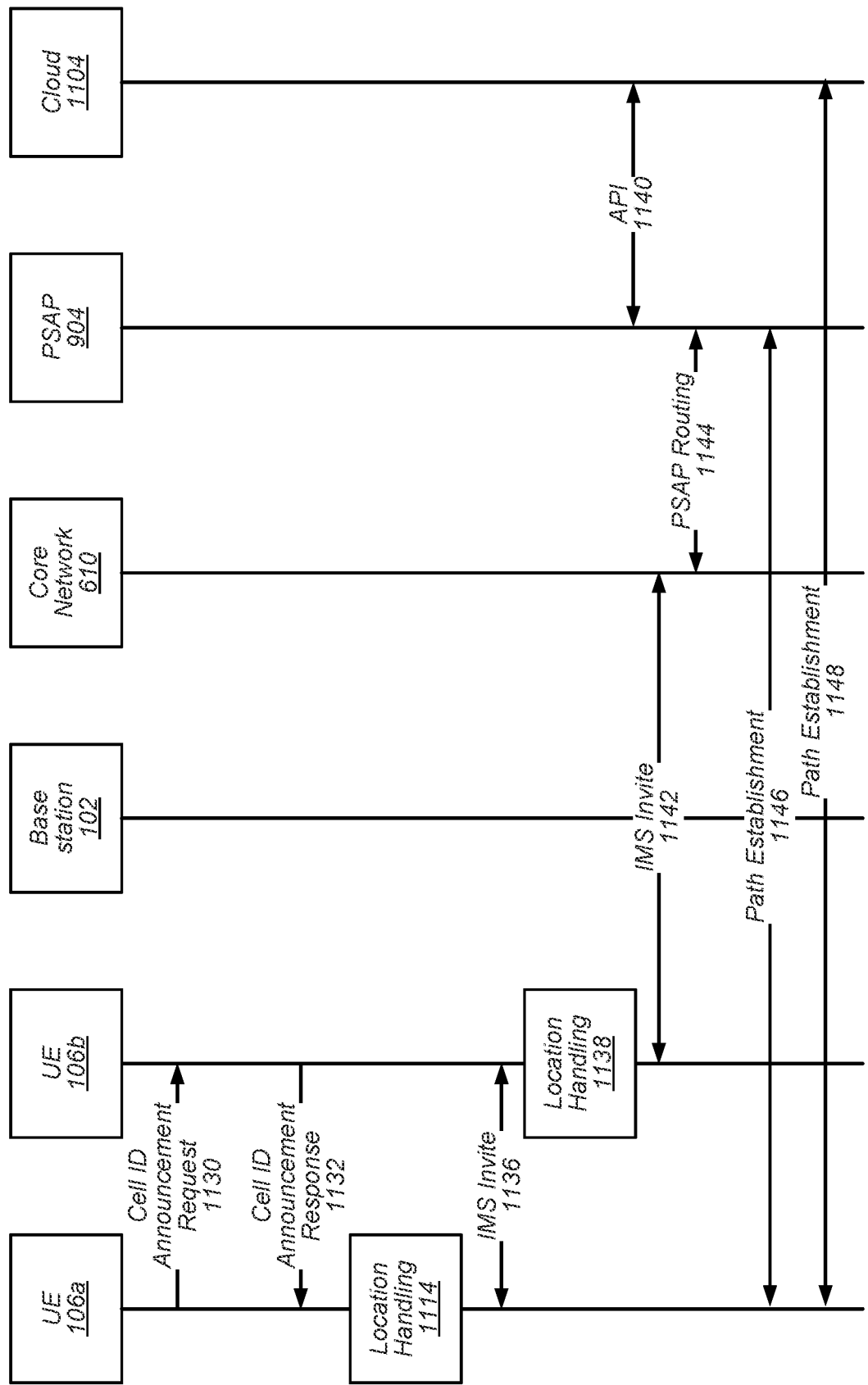
FIG. 11B illustrates an example of signaling for an out-of-service UE to complete an emergency communication, including establishing a connection with a cloud server, according to some embodiments.

FIGS. 11A and 11B illustrate further examples of signaling for an out-of-service UE to complete an emergency communication via an in-service UE, according to some embodiments. In particular, FIG. 11A illustrates an example of signaling for an out-of-service UE to complete an emergency communication via an in-service UE, according to some embodiments and FIG. 11B illustrates an example of signaling for an out-of-service UE to complete an emergency communication, including establishing a connection with a cloud server, according to some embodiments.

Turning to FIG. 11A, once a remote UE, such as UE 106a, establishes a D2D emergency communication session, e.g., as described herein with a relay UE, such as UE 106b, the remote UE may send a cell identity (ID) announcement request message 1110 to the relay UE. The relay UE may respond with a cell ID announcement response message 1112. The cell ID announcement response message 1112 may include a cell ID associated with a cell the relay UE is camped on. At 1114, the remote UE may determine an approximate location, e.g., based at least in part on global positioning system (GPS) data and/or other available location information. At 1116, the remote UE may establish device-to-device (D2D) communication with the relay UE, e.g., UE 106b, e.g., via IMS invite and registration procedure 1116. During IMS invite and registration procedure, the remote UE may provide information associated with the emergency condition to the relay UE. For example, the remote UE may provide an indication of a type of emergency, the approximate location of the remote UE, and/or other information associated with the emergency condition. In some embodiments, IMS invite and registration procedure may be performed on an unlicensed band of the frequency spectrum. In some embodiments, the IMS invite and registration procedure may be performed based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the IMS invite and registration procedure may be performed based on and/or in conjunction with 3GPP PC5 communication protocol. In some embodiments, the IMS invite and registration procedure may be performed using an emergency channel, e.g., as described herein.

At 1118, the relay UE may determine whether to use the approximate location supplied by the remote UE and/or whether to determine a confidence metric associated with the approximate location of the remote UE. In other words, the relay may determine whether to perform a procedure to enhance an estimation of the location of the remote UE, e.g., as further described herein. In some embodiments, the relay UE and remote UE may perform a ranging procedure to aid in determination of a location of the remote UE. Further, the relay UE may determine client location information to share with a network, e.g., such as the approximate location of the remote UE, a confidence metric associated with the approximate location of the remote UE, and/or results of a ranging procedure with the remote UE.

For example, in some embodiments, a relay UE, e.g., such as UE 106 and/or UE 106b, may perform a location enhancement and/or calculate a confidence metric for a location provided by a client (and/or target) UE, e.g., such as UE 106 and/or UE 106a. As an example, in some embodiments, the remote UE may request the relay UE's serving cell and location (e.g., latitude, longitude, and/or height (e.g., relative to sea level) with uncertainty. Then, the remote UE may calculate a range between UE's using a two-sided round-trip time (RTT). Then, the remote UE may use the range between the UE's and the relay UE's location data to calculate an approximate location of the remote UE. In some embodiments, as the UEs move relative to one another, range and position data can be updated periodically to aid in sending updates to a PSAP, alerts to a third-party cloud server, and/or to detect proximity and edge conditions for call and packet data link quality. In some embodiments, users of the UE may exchange and/or share their positions, health information, sensor data using over-the-top (OTT) once data paths are established in parallel with a voice path, e.g., as described herein. In some embodiments, the remote UE may use the location of the relay UE to aid other positioning sources such as GNSS and reduce search and position calculation time, thereby saving critical battery resources in out-of-service conditions. In some embodiments, the remote UE may send location information (latitude, longitude, height, uncertainty, and/or confidence level to the relay UE. In some embodiments, the relay UE may then pass the location information of the remote UE to the core network, e.g., by acting as a layer 2 (L2) bridge between the remote UE and the core network. The core network may then pass the location information of the remote UE to the PSAP and the PSAP may rely on the location from remote UE.

At 1122, the relay UE may perform IMS registration with the core network 610 on behalf of the remote UE. Further, at 1124, the core network may perform PSAP routing and select a PSAP, such as PSAP 904. Note that in some embodiments, PSAP may have on-going communications with a third party-cloud server 1104, e.g., via an application program interface, such as API 1120. Note that via API 1120, third-party cloud server 1104 may be configured to provide information associated with the remote UE and/or the relay UE. In some embodiments, the provided information may aid in locating and/or assisting the remote UE. Additionally, at 1126, PSAP 904 may establish a voice and/or datapath for communications with the remote UE via the relay UE.

Turing to FIG. 11B, once a remote UE, such as UE 106a, establishes a D2D emergency communication session, e.g., as described herein with a relay UE, such as UE 106b, the remote UE may send a cell identity (ID) announcement request message 1130 to the relay UE. The relay UE may respond with a cell ID announcement response message 1132. The cell ID announcement response message 1132 may include a cell ID associated with a cell the relay UE is camped on. At 1134, the remote UE may determine an approximate location, e.g., based at least in part on global positioning system (GPS) data and/or other available location information. At 1136, the remote UE may establish device-to-device (D2D) communication with the relay UE, e.g., UE 106b, e.g., via IMS invite and registration procedure 1136. During IMS invite and registration procedure, the remote UE may provide information associated with the emergency condition to the relay UE. For example, the remote UE may provide an indication of a type of emergency, the approximate location of the remote UE, and/or other information associated with the emergency condition. In some embodiments, IMS invite and registration procedure may be performed on an unlicensed band of the frequency spectrum. In some embodiments, the IMS invite and registration procedure may be performed based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the IMS invite and registration procedure may be performed based on and/or in conjunction with 3GPP PC5 communication protocol. In some embodiments, the IMS invite and registration procedure may be performed using an emergency channel, e.g., as described herein.

At 1138, the relay UE may determine whether to use the approximate location supplied by the remote UE and/or whether to determine a confidence metric associated with the approximate location of the remote UE. In other words, the relay may determine whether to perform a procedure to enhance an estimation of the location of the remote UE, e.g., as further described herein. In some embodiments, the relay UE and remote UE may perform a ranging procedure to aid in determination of a location of the remote UE. Further, the relay UE may determine client location information to share with a network, e.g., such as the approximate location of the remote UE, a confidence metric associated with the approximate location of the remote UE, and/or results of a ranging procedure with the remote UE.

For example, in some embodiments, a relay UE, e.g., such as UE 106 and/or UE 106b, may perform a location enhancement and/or calculate a confidence metric for a location provided by a client (and/or target) UE, e.g., such as UE 106 and/or UE 106a. As an example, in some embodiments, the remote UE may request the relay UE's serving cell and location (e.g., latitude, longitude, and/or height (e.g., relative to sea level) with uncertainty. Then, the remote UE may calculate a range between UE's using a two-sided round-trip time (RTT). Then, the remote UE may use the range between the UE's and the relay UE's location data to calculate an approximate location of the remote UE. In some embodiments, as the UEs move relative to one another, range and position data can be updated periodically to aid in sending updates to a PSAP, alerts to a third-party cloud server, and/or to detect proximity and edge conditions for call and packet data link quality. In some embodiments, users of the UE may exchange and/or share their positions, health information, sensor data using over-the-top (OTT) once data paths are established in parallel with a voice path, e.g., as described herein. In some embodiments, the remote UE may use the location of the relay UE to aid other positioning sources such as GNSS and reduce search and position calculation time, thereby saving critical battery resources in out-of-service conditions. In some embodiments, the remote UE may send location information (latitude, longitude, height, uncertainty, and/or confidence level to the relay UE. In some embodiments, the relay UE may then pass the location information of the remote UE to the core network, e.g., by acting as a layer 2 (L2) bridge between the remote UE and the core network. The core network may then pass the location information of the remote UE to the PSAP and the PSAP may rely on the location from remote UE.

At 1142, the relay UE may perform IMS registration with the core network 610 on behalf of the remote UE. Further, at 1144, the core network may perform PSAP routing and select a PSAP, such as PSAP 904. Note that in some embodiments, PSAP may have on-going communications with a third party-cloud server 1104, e.g., via an application program interface, such as API 1140. Note that via API 1140, third-party cloud server 1104 may be configured to provide information associated with the remote UE and/or the relay UE. In some embodiments, the provided information may aid in locating and/or assisting the remote UE. Further, at 1146, PSAP 904 may establish a voice and/or datapath for communications with the remote UE via the relay UE. In addition, at 1148, third-party cloud server 1104 may establish a datapath with the remote UE via the relay UE. In some embodiments, the datapath may be established based on information received and/or obtained from PSAP 904, e.g., via API 1140. In some embodiments, the remote UE may exchange information such as user health, remote UE location, and/or UE sensor information via the data path.

Figure 12A:
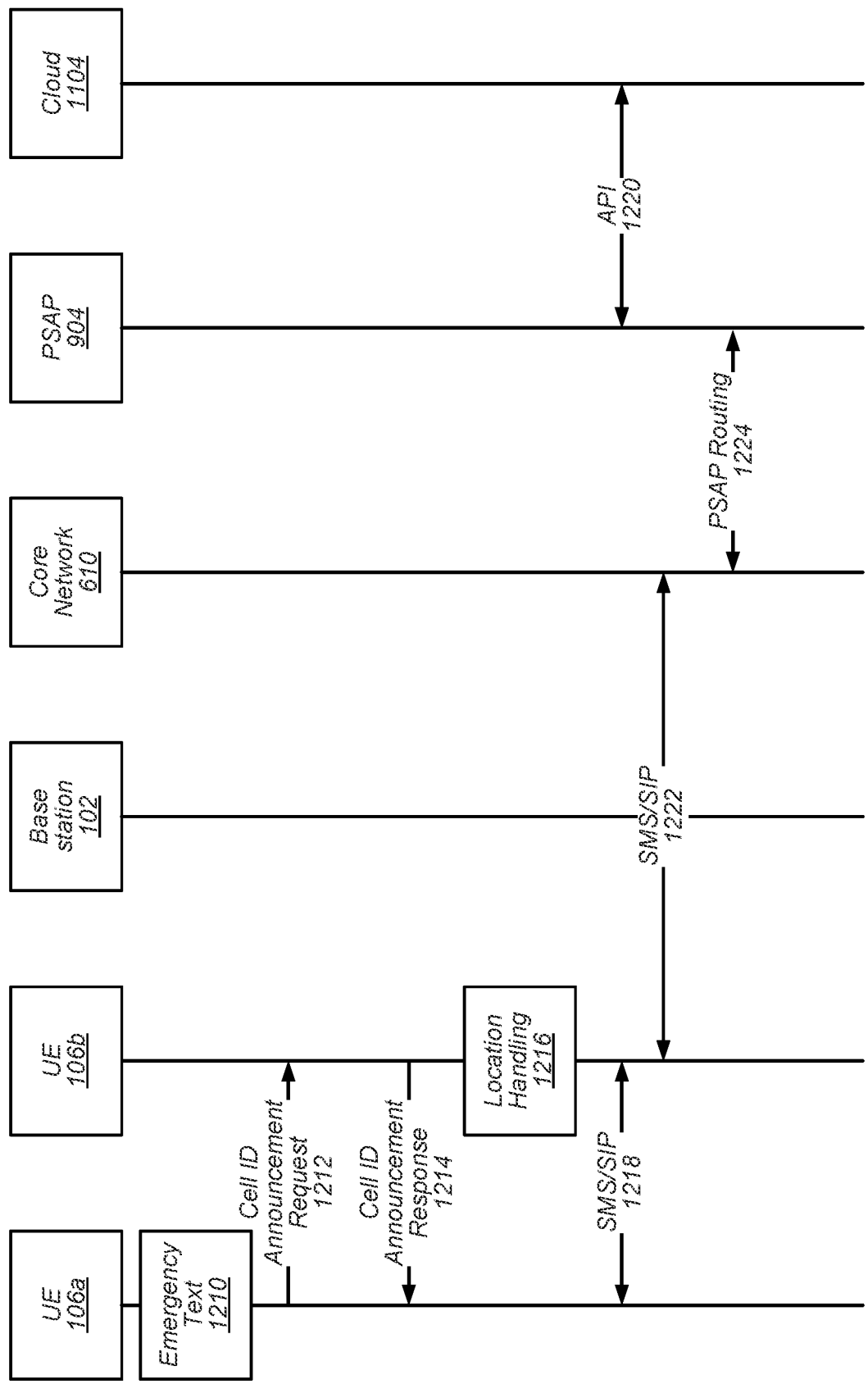
FIG. 12A illustrates an example of signaling for an out-of-service UE to complete an emergency text via an in-service UE, according to some embodiments.
Figure 12B:
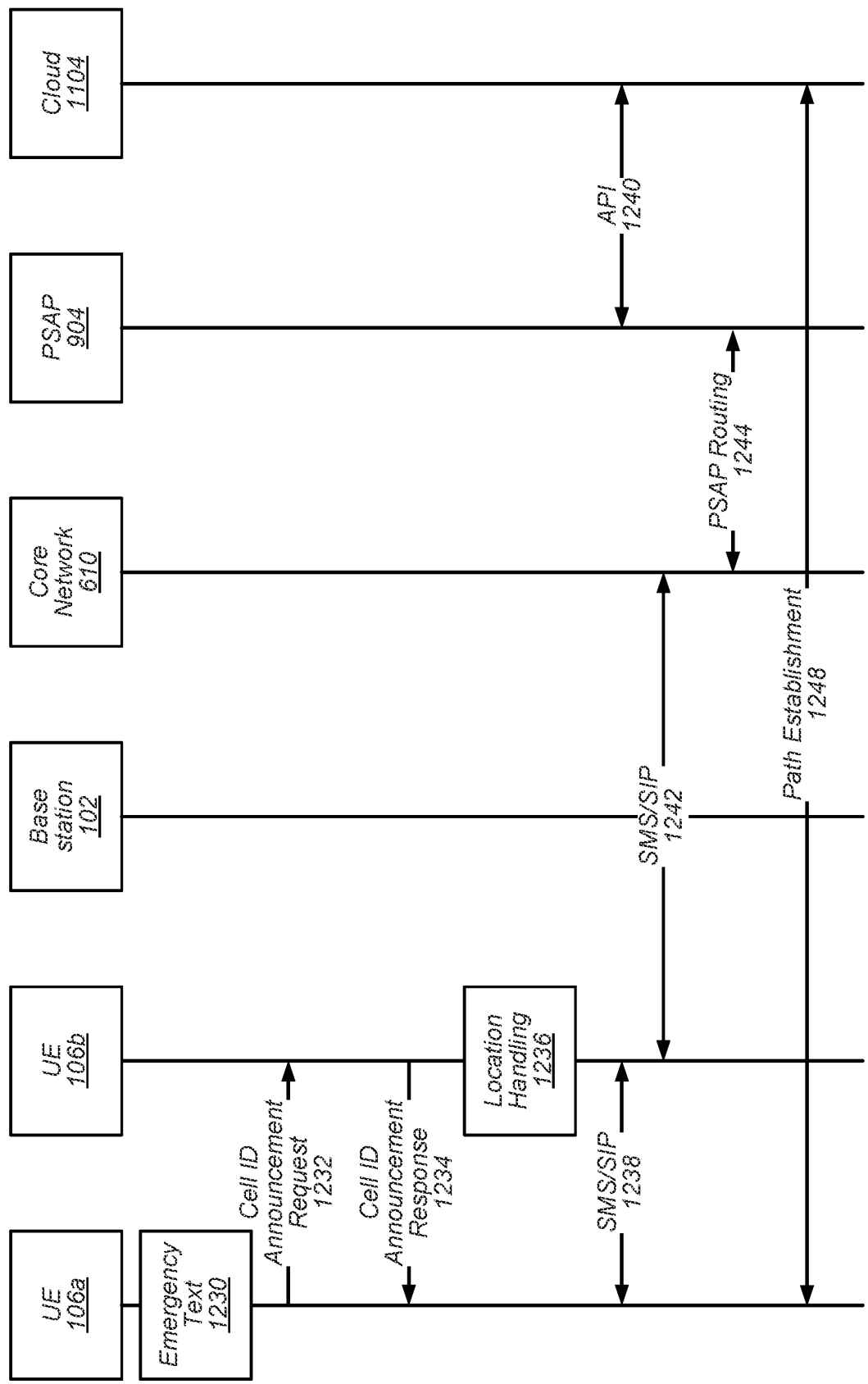
FIG. 12B illustrates an example of signaling for an out-of-service UE to complete an emergency text, including establishing a connection with a cloud server, according to some embodiments.

FIGS. 12A and 12B illustrate further examples of signaling for an out-of-service UE to complete an emergency text via an in-service UE, according to some embodiments. In particular, FIG. 12A illustrates an example of signaling for an out-of-service UE to complete an emergency text via an in-service UE, according to some embodiments and FIG. 12B illustrates an example of signaling for an out-of-service UE to complete an emergency text, including establishing a connection with a cloud server, according to some embodiments.

Turning to FIG. 12A, once a remote UE, such as UE 106a, establishes a D2D emergency communication session, e.g., as described herein with a relay UE, such as UE 106b, the remote UE may initiate transmission of an emergency text 1210. In some embodiments, emergency text 1210 may be an SMS message. In some embodiments, emergency text 1210 may be another type of instant message, such a proprietary type of instant message. Based on the initiation of transmission of the emergency text 1210, the remote UE may transmit a cell identity (ID) announcement request message 1212 to the relay UE. The relay UE may respond with a cell ID announcement response message 1214. The cell ID announcement response message 1214 may include a cell ID associated with a cell the relay UE is camped on. In some embodiments, the remote UE may determine an approximate location, e.g., based at least in part on global positioning system (GPS) data and/or other available location information. In some embodiments, the remote UE may share the approximate location information as part of the cell ID announcement request 1212.

At 1216, the relay UE may determine whether to use the approximate location supplied by the remote UE and/or whether to determine a confidence metric associated with the approximate location of the remote UE. In other words, the relay may determine whether to perform a procedure to enhance an estimation of the location of the remote UE, e.g., as further described herein. In some embodiments, the relay UE and remote UE may perform a ranging procedure to aid in determination of a location of the remote UE. Further, the relay UE may determine client location information to share with a network, e.g., such as the approximate location of the remote UE, a confidence metric associated with the approximate location of the remote UE, and/or results of a ranging procedure with the remote UE.

For example, in some embodiments, a relay UE, e.g., such as UE 106 and/or UE 106b, may perform a location enhancement and/or calculate a confidence metric for a location provided by a client (and/or target) UE, e.g., such as UE 106 and/or UE 106a. As an example, in some embodiments, the remote UE may request the relay UE's serving cell and location (e.g., latitude, longitude, and/or height (e.g., relative to sea level) with uncertainty. Then, the remote UE may calculate a range between UE's using a two-sided round-trip time (RTT). Then, the remote UE may use the range between the UE's and the relay UE's location data to calculate an approximate location of the remote UE. In some embodiments, as the UEs move relative to one another, range and position data can be updated periodically to aid in sending updates to a PSAP, alerts to a third-party cloud server, and/or to detect proximity and edge conditions for call and packet data link quality. In some embodiments, users of the UE may exchange and/or share their positions, health information, sensor data using over-the-top (OTT) once data paths are established in parallel with a voice path, e.g., as described herein. In some embodiments, the remote UE may use the location of the relay UE to aid other positioning sources such as GNSS and reduce search and position calculation time, thereby saving critical battery resources in out-of-service conditions. In some embodiments, the remote UE may send location information (latitude, longitude, height, uncertainty, and/or confidence level to the relay UE. In some embodiments, the relay UE may then pass the location information of the remote UE to the core network, e.g., by acting as a layer 2 (L2) bridge between the remote UE and the core network. The core network may then pass the location information of the remote UE to the PSAP and the PSAP may rely on the location from remote UE.

At 1218, the remote UE may establish device-to-device communication with the relay UE, e.g., UE 106b, e.g., via an SMS/SIP procedure 1218. During the SMS/SIP procedure, the remote UE may provide information associated with the emergency condition to the relay UE. For example, the remote UE may provide an indication of a type of emergency, the approximate location of the remote UE, and/or other information associated with the emergency condition.

In some embodiments, SMS/SIP procedure may be performed on an unlicensed band of the frequency spectrum. In some embodiments, the SMS/SIP procedure may be performed based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the SMS/SIP procedure may be performed based on and/or in conjunction with 3GPP PC5 communication protocol. In some embodiments, the SMS/SIP procedure may be performed using an emergency channel, e.g., as described herein.

At 1222, the relay UE may perform a SMS/SIP procedure with the core network 610 on behalf of the remote UE. Further, at 1224, the core network may perform PSAP routing and select a PSAP, such as PSAP 904. Note that in some embodiments, PSAP may have on-going communications with a third party-cloud server 1204, e.g., via an application program interface, such as API 1220. Note that via API 1220, third-party cloud server 1204 may be configured to provide information associated with the remote UE and/or the relay UE. In some embodiments, the provided information may aid in locating and/or assisting the remote UE.

Turing to FIG. 12B once a remote UE, such as UE 106a, establishes a D2D emergency communication session, e.g., as described herein with a relay UE, such as UE 106b, the remote UE may initiate transmission of an emergency text 1230. In some embodiments, emergency text 1230 may be an SMS message. In some embodiments, emergency text 1230 may be another type of instant message, such a proprietary type of instant message. Based on the initiation of transmission of the emergency text 1230, the remote UE may transmit a cell identity (ID) announcement request message 1234 to the relay UE. The relay UE may respond with a cell ID announcement response message 1234. The cell ID announcement response message 1234 may include a cell ID associated with a cell the relay UE is camped on. In some embodiments, the remote UE may determine an approximate location, e.g., based at least in part on global positioning system (GPS) data and/or other available location information. In some embodiments, the remote UE may share the approximate location information as part of the cell ID announcement request 1234.

At 1236, the relay UE may determine whether to use the approximate location supplied by the remote UE and/or whether to determine a confidence metric associated with the approximate location of the remote UE. In other words, the relay may determine whether to perform a procedure to enhance an estimation of the location of the remote UE, e.g., as further described herein. In some embodiments, the relay UE and remote UE may perform a ranging procedure to aid in determination of a location of the remote UE. Further, the relay UE may determine client location information to share with a network, e.g., such as the approximate location of the remote UE, a confidence metric associated with the approximate location of the remote UE, and/or results of a ranging procedure with the remote UE.

For example, in some embodiments, a relay UE, e.g., such as UE 106 and/or UE 106b, may perform a location enhancement and/or calculate a confidence metric for a location provided by a client (and/or target) UE, e.g., such as UE 106 and/or UE 106a. As an example, in some embodiments, the remote UE may request the relay UE's serving cell and location (e.g., latitude, longitude, and/or height (e.g., relative to sea level) with uncertainty. Then, the remote UE may calculate a range between UE's using a two-sided round-trip time (RTT). Then, the remote UE may use the range between the UE's and the relay UE's location data to calculate an approximate location of the remote UE. In some embodiments, as the UEs move relative to one another, range and position data can be updated periodically to aid in sending updates to a PSAP, alerts to a third-party cloud server, and/or to detect proximity and edge conditions for call and packet data link quality. In some embodiments, users of the UE may exchange and/or share their positions, health information, sensor data using over-the-top (OTT) once data paths are established in parallel with a voice path, e.g., as described herein. In some embodiments, the remote UE may use the location of the relay UE to aid other positioning sources such as GNSS and reduce search and position calculation time, thereby saving critical battery resources in out-of-service conditions. In some embodiments, the remote UE may send location information (latitude, longitude, height, uncertainty, and/or confidence level to the relay UE. In some embodiments, the relay UE may then pass the location information of the remote UE to the core network, e.g., by acting as a layer 2 (L2) bridge between the remote UE and the core network. The core network may then pass the location information of the remote UE to the PSAP and the PSAP may rely on the location from remote UE.

At 1238, the remote UE may establish device-to-device communication with the relay UE, e.g., UE 106b, e.g., via an SMS/SIP procedure 1238. During the SMS/SIP procedure, the remote UE may provide information associated with the emergency condition to the relay UE. For example, the remote UE may provide an indication of a type of emergency, the approximate location of the remote UE, and/or other information associated with the emergency condition. In some embodiments, SMS/SIP procedure may be performed on an unlicensed band of the frequency spectrum. In some embodiments, the SMS/SIP procedure may be performed based on any, any combination of, and/or all of, a dedicated peer-to-peer protocol, cellular based communications, Wi-Fi based communications, Bluetooth and/or Bluetooth Low Energy based communications, as well as other longer-range and/or shorter-range communication technologies. In some embodiments, the SMS/SIP procedure may be performed based on and/or in conjunction with 3GPP PC5 communication protocol. In some embodiments, the SMS/SIP procedure may be performed using an emergency channel, e.g., as described herein.

At 1242, the relay UE may perform a SMS/SIP procedure with the core network 610 on behalf of the remote UE. Further, at 1244, the core network may perform PSAP routing and select a PSAP, such as PSAP 904. Note that in some embodiments, PSAP may have on-going communications with a third party-cloud server 1204, e.g., via an application program interface, such as API 1240. Note that via API 1240, third-party cloud server 1204 may be configured to provide information associated with the remote UE and/or the relay UE. In some embodiments, the provided information may aid in locating and/or assisting the remote UE. In addition, at 1248, third-party cloud server 1204 may establish a datapath with the remote UE via the relay UE. In some embodiments, the datapath may be established based on information received and/or obtained from PSAP 904, e.g., via API 1240. In some embodiments, the remote UE may exchange information such as user health, remote UE location, and/or UE sensor information via the data path.

Figure 13A:
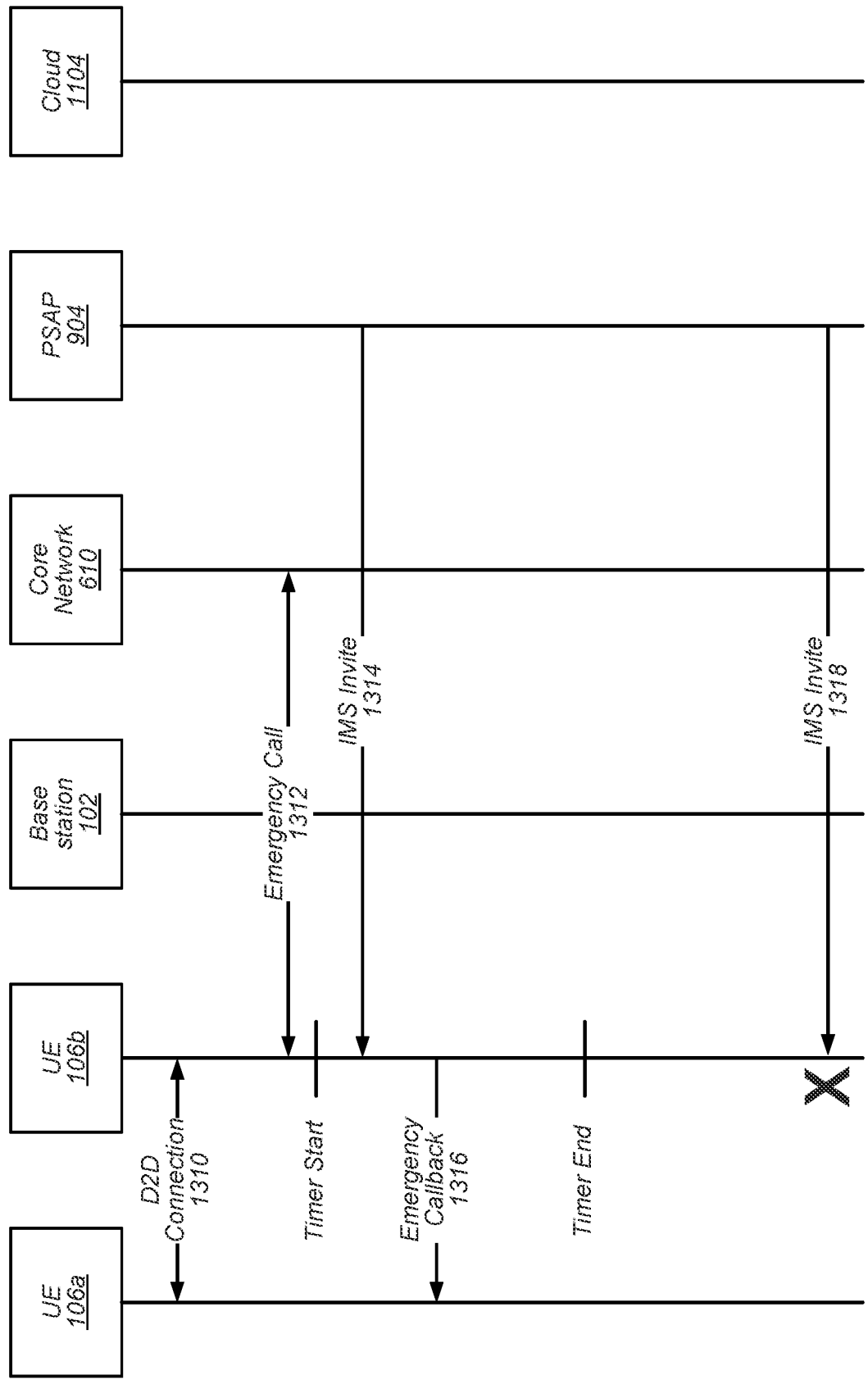
FIG. 13A illustrates an example of signaling for an out-of-service UE to receive an emergency callback via an in-service UE, according to some embodiments.
Figure 13B:
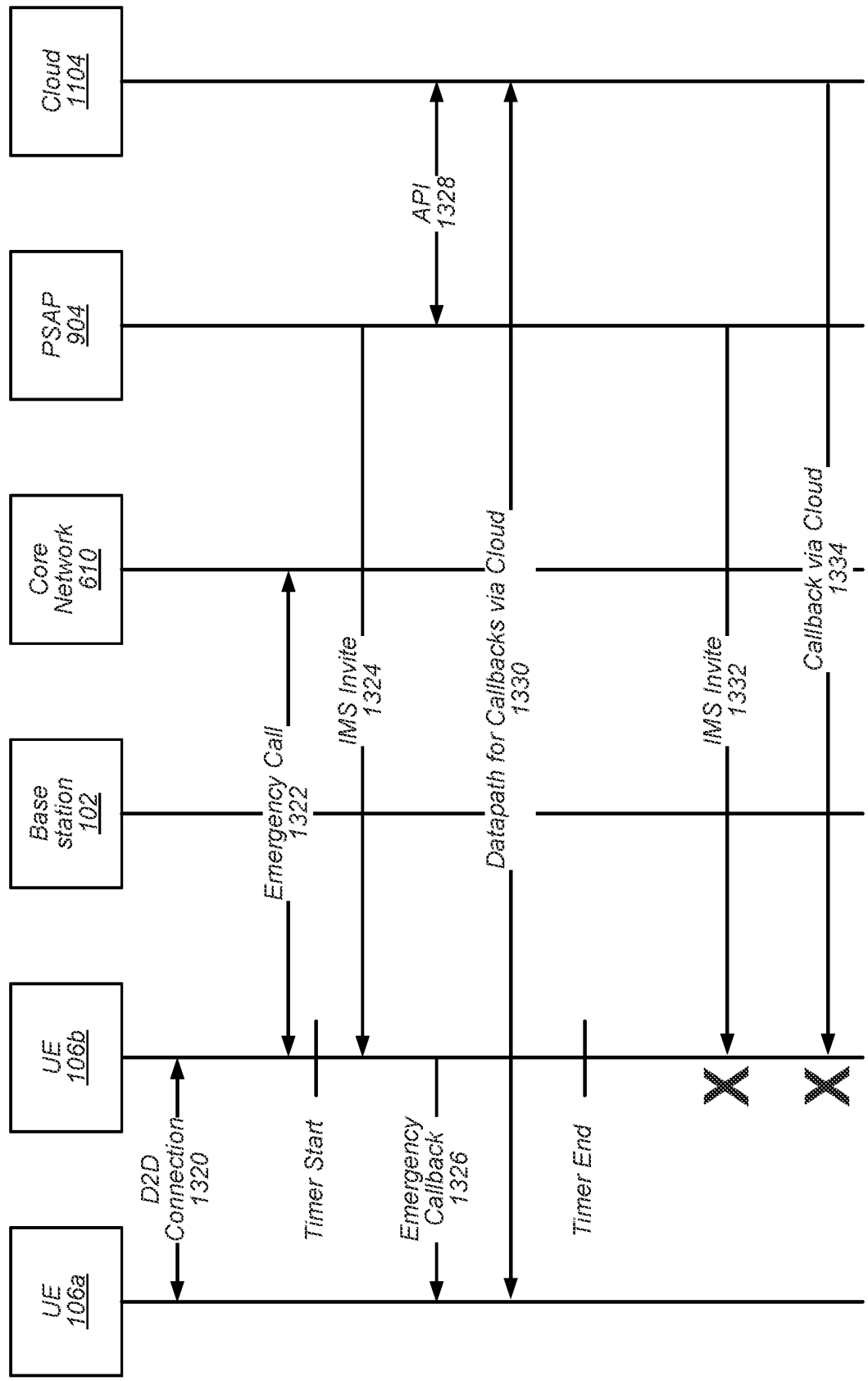
FIG. 13B illustrates an example of signaling for an out-of-service UE to receive an emergency callback, including establishing a connection with a cloud server, according to some embodiments.

FIGS. 13A and 13B illustrate examples of signaling for an out-of-service UE to receive an emergency callback via an in-service UE, according to some embodiments. In particular, FIG. 13A illustrates an example of signaling for an out-of-service UE to receive an emergency callback via an in-service UE, according to some embodiments and FIG. 13B illustrates an example of signaling for an out-of-service UE to receive an emergency callback, including establishing a connection with a cloud server, according to some embodiments.

Turning to FIG. 13A, once a remote UE, such as UE 106a, establishes a D2D emergency communication session 1310, e.g., as described herein with a relay UE, such as UE 106b, the relay UE may perform an emergency call 1312, e.g., as described herein. As shown, after completion of the emergency call 1312, a timer may be initiated, where the timer is associated with an emergency callback from PSAP 904. For example, prior to expiration of the timer, PSAP 904 may send an IMS invite 1314 to the relay UE. As shown, the relay UE may forward the IMS invite 1314 to the remote UE, e.g., via emergency callback 1316. However, after expiration of the timer, an IMS invite 1318 from PSAP 904 may fail and the relay UE may not forward the IMS invite 1318 to the remote UE.

Turning to FIG. 13B, once a remote UE, such as UE 106a, establishes a D2D emergency communication session 1320, e.g., as described herein with a relay UE, such as UE 106b, the relay UE may perform an emergency call 1322, e.g., as described herein. As shown, after completion of the emergency call 1322, a timer may be initiated, where the timer is associated with an emergency callback from PSAP 904 and/or third-party cloud server 1104. For example, prior to expiration of the timer, PSAP 904 may send an IMS invite 1314 to the relay UE. As shown, the relay UE may forward the IMS invite 1314 to the remote UE, e.g., via emergency callback 1316. Similarly, third-party cloud server 1104 may initiate a callback 1330 via a datapath (e.g., as described herein) supported by the relay UE. However, after expiration of the timer, an IMS invite 1332 from PSAP 904 and/or a callback 1332 from third-party cloud server 1104 may fail and the relay UE may not forward the IMS invite 1332 or the callback via the third-party cloud server 1104 to the remote UE.

Figure 14:
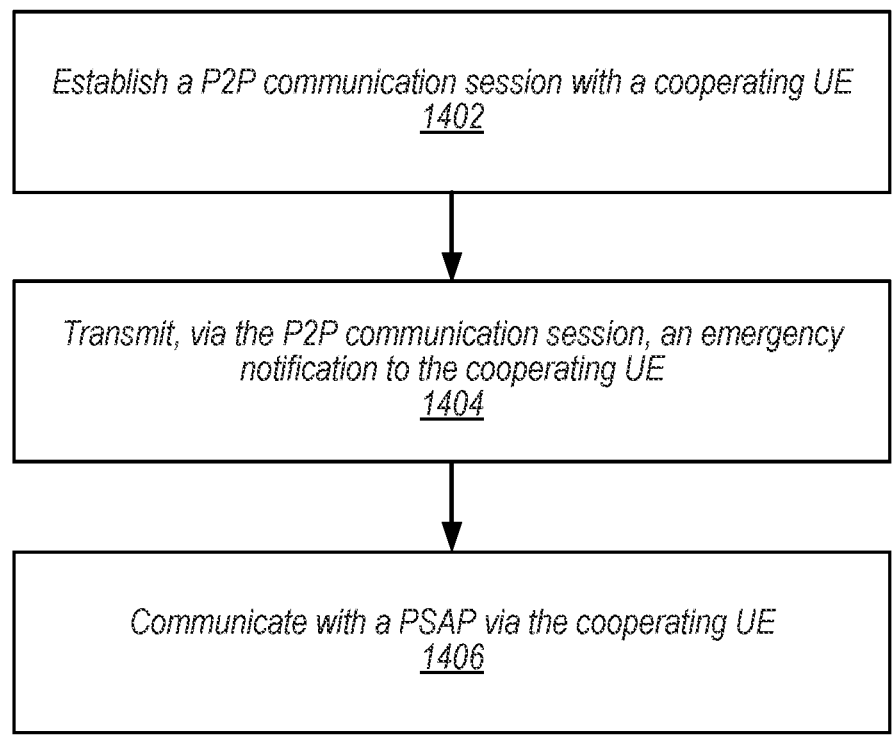
FIG. 14 illustrates a block diagram of an example of a method for establishing an emergency communication, according to some embodiments.

FIG. 14 illustrates a block diagram of an example of a method for establishing an emergency communication, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a peer-to-peer (P2P) (e.g., a device-to-device (D2D) communication session may be established between a host (e.g., client) UE, such as UE 106a, and a cooperating (e.g., relay and/or relaying) UE, such as UE 106b. In some embodiments, the remote UE may be out of range of cellular service. In some embodiments, the peer-to-peer communication session may be established using a channel in an unlicensed frequency band. In some embodiments, the peer-to-peer communication session may be established based on at least one of cellular based communications, Wi-Fi based communications, and/or Bluetooth/Bluetooth Low Energy based communications. In some embodiments, the peer-to-peer communication session may be established based on and/or in conjunction with 3GPP PC5 communication protocol.

In some embodiments, the peer-to-peer communication session may be established using an emergency channel. In some embodiments, the emergency channel may be region specific. In some embodiments, the emergency channel may be specified as part of 3GPP PC5 communication protocol. In some embodiments, the emergency channel may be a dedicated physical channel. In some embodiments, the emergency channel may be embedded into a broadcasting channel. In some embodiments, the broadcasting channel may be a physical sidelink broadcast channel (PSBCH).

At 1404, the remote UE may transmit, via the P2P communication session, an emergency notification to the cooperating UE. In some embodiments, the emergency notification may include at least an approximate location of the remote UE. In some embodiments, determining the approximate location of the remote UE may be based, at least in part, on a location of the cooperating UE. In some embodiments, determining the approximate location of the remote UE may include performing a ranging procedure with the cooperating UE. In some embodiments, determining the approximate location of the UE may include receiving the location of the cooperating UE via the peer-to-peer communication session. In some embodiments, the approximate location of the UE may include a latitude, a longitude, and a height of the UE. In some embodiments, the emergency notification may further include an indication of a type of emergency.

At 1406, the remote UE may communicate with a PSAP via the cooperating UE. In other words, communications may be relayed between the remote UE and the PSAP by the cooperating UE. In some embodiments, the emergency communication may be a data message and/or a voice call.

In some embodiments, the remote UE may communicate with a third-party cloud server, such as third-party cloud server 1104. In such embodiments, communications may be relayed between the remote UE and the third-party cloud server by the cooperating UE. In some embodiments, the remote UE may send, via the cooperating UE, at least one of the approximate location of the UE, health information associated with a user of the UE, and/or UE sensor data to the third-party cloud server.

In some embodiments, the remote UE may transmit, to the cooperating UE, a cell identity announcement request message. In such embodiments, the remote UE may receive, from the cooperating UE, a cell identity announcement response message. In some embodiments, the cell identity announcement response message may include a cell identity for a cell the cooperating UE is camped on.

Figure 15:
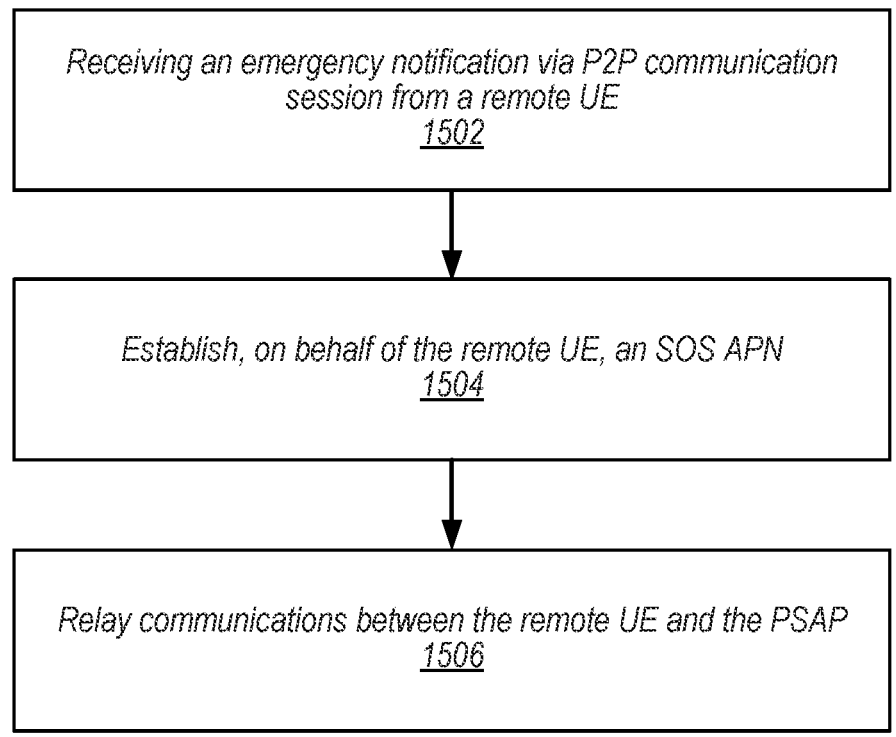
FIG. 15 illustrates a block diagram of another example of a method for establishing an emergency communication, according to some embodiments.

FIG. 15 illustrates a block diagram of another example of a method for establishing an emergency communication, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a relay (e.g., cooperating UE) UE, e.g., such as UE 106b, may receive an emergency notification from a host (e.g., client) UE, such as UE 106a. In some embodiments, the emergency notification may include an approximate location of the remote UE and the remote UE may be out of range of cellular service. In some embodiments, the emergency notification may be received using a peer-to-peer communication session established between the relay UE and remote UE. In some embodiments, determining the approximate location of the remote UE may be based, at least in part, on a location of the cooperating UE. In some embodiments, determining the approximate location of the remote UE may include performing a ranging procedure with the cooperating UE. In some embodiments, determining the approximate location of the UE may include receiving the location of the cooperating UE via the peer-to-peer communication session. In some embodiments, the approximate location of the UE may include a latitude, a longitude, and a height of the UE. In some embodiments, the emergency notification may further include an indication of a type of emergency.

In some embodiments, a request to establish the peer-to-peer communication session may be received using an unlicensed frequency band. In some embodiments, the peer-to-peer communication session may be established based on at least one of a dedicated peer-to-peer protocol, cellular based communications, Wi-Fi based communications, and/or Bluetooth/Bluetooth Low Energy based communications. In some embodiments, the peer-to-peer communication session may be established based on and/or in conjunction with 3GPP PC5 communication protocol.

In some embodiments, the peer-to-peer communication session may be established using an emergency channel. In some embodiments, the emergency channel may be region specific. In some embodiments, the emergency channel may be specified as part of 3GPP PC5 communication protocol. In some embodiments, the emergency channel may be a dedicated physical channel. In some embodiments, the emergency channel may be embedded into a broadcasting channel. In some embodiments, the broadcasting channel may be a physical sidelink broadcast channel (PSBCH).

At 1504, the relay UE may establish, on behalf of the remote UE, an SOS APN with a function of the core network. In some embodiments, the SOS APN may be established based, at least in part, on the approximate location of the remote UE.

At 1506, the relay UE may relay communications between the remote UE and a PSAP, e.g., such as PSAP 904 based on the established SOS APN. In some embodiments, the emergency communication may be a data message and/or a voice call.

In some embodiments, the relay UE may communicate with a third-party cloud server, such as third-party cloud server 1104, on behalf of the remote UE. In such embodiments, the relay UE may relay communications between the remote UE and the third-party cloud server. In some embodiments, the relay UE may receive, from the remote UE, at least one of the approximate location of the UE, health information associated with a user of the UE, and/or UE sensor data. The relay UE may send at least one of the approximate location of the UE, health information associated with a user of the UE, and/or UE sensor data received from the remote UE to the third-party cloud server.

In some embodiments, the relay UE may receive, from the remote UE, a cell identity announcement request message. In such embodiments, the relay UE may transmit, to the remote UE, a cell identity announcement response message. In some embodiments, the cell identity announcement response message may include a cell identity for a cell the relay UE is camped on.

Figure 16:
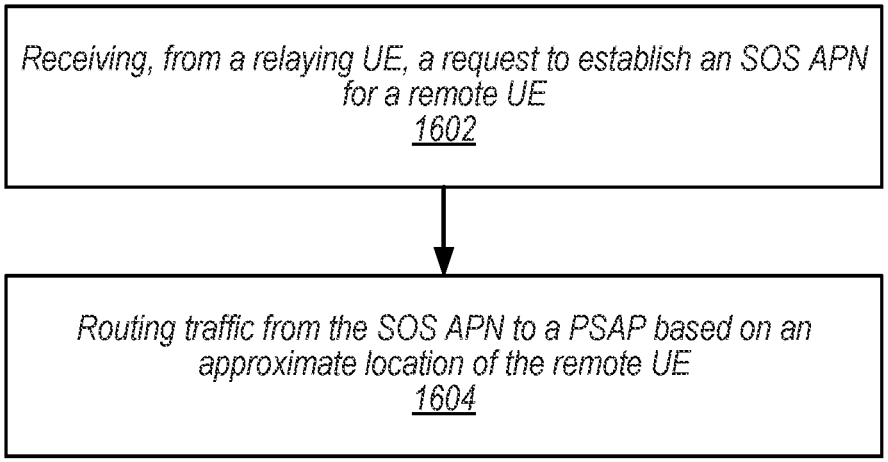
FIG. 16 illustrates a block diagram of an example of a method for establishing an emergency communication for a remote UE, according to some embodiments.

FIG. 16 illustrates a block diagram of an example of a method for establishing an emergency communication for a remote UE, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a function of a core network may receive, from a relaying (e.g., cooperating UE) UE, e.g., such as UE 106b, a request to establish an SOS APN for a host (e.g., client) UE, such as UE 106a. In some embodiments, the request may include at least an approximate location of the remote UE. In some embodiments, the remote UE may be out of range of cellular service. In some embodiments, the approximate location of the remote UE may be based, at least in part, on a location of the relaying UE. In some embodiments, the approximate location of the remote UE may include a latitude, a longitude, and a height of the remote UE. In some embodiments, the request may further include an indication of a type of emergency. In some embodiments, the request may further include an indication of a confidence in the approximate location of the remote UE.

At 1604, the function of the core network may route communications using SOS APN (e.g., traffic) to a PSAP, such as PSAP 904. In some embodiments, the routing may be based, at least in part, on the approximate location of the remote UE. In some embodiments, the PSAP may have a coverage area that includes the approximate location of the remote UE.

In some embodiments, the function of the core network may receive, from the relaying UE, a radio resource control connection (RRC) connection request for the remote UE. In such embodiments, the function of the core network may perform a layer 3 IP Multimedia Core Network Subsystem (IMS) registration procedure with the remote UE via the relay UE. In some embodiments, the function of the core network may perform, with the relay UE, an IP Multimedia Core Network Subsystem (IMS) registration procedure to register the remote UE.

Figure 17:
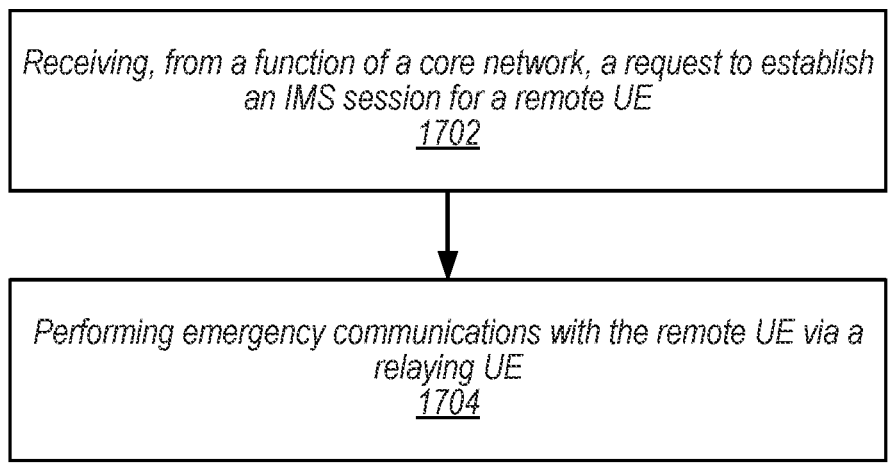
FIG. 17 illustrates a block diagram of another example of a method for establishing an emergency communication for a remote UE, according to some embodiments.

FIG. 17 illustrates a block diagram of another example of a method for establishing an emergency communication for a remote UE, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a PSAP, such as PSAP 1002, may receive, from a function of a core network a request to establish an IMS session for a host (e.g., client) UE, such as UE 106a. In some embodiments, the request may include at least an approximate location of the remote UE. In some embodiments, the remote UE may be out of range of cellular service. In some embodiments, the approximate location of the remote UE may be based, at least in part, on a location of the relaying UE. In some embodiments, the approximate location of the remote UE may include a latitude, a longitude, and a height of the remote UE. In some embodiments, the request may further include an indication of a type of emergency. In some embodiments, the request may further include an indication of a confidence in the approximate location of the remote UE. In some embodiments, the request may be based, at least in part, on the relaying UE requesting establishment of an SOS APN on behalf of the remote UE with the function of the core network.

At 1704, the PSAP may perform emergency communications with the remote UE via a relay UE, such as UE 106b.

In some embodiments, the emergency communication may be a data message and/or a voice call.

In some embodiments, the PSAP may receive, via an application protocol interface, at least one of the approximate location of the remote UE, health information associated with a user of the remote UE, or remote UE sensor data from a third-party cloud server, such as third-party cloud server 1104.

In some embodiments, after concluding the emergency communication with the remote UE via the relay UE, the PSAP may initiate a follow up emergency communication with the remote UE via the relay UE. In some embodiments, initiating the follow up emergency communication may include sending, to the relay UE, an IP Multimedia Core Network Subsystem (IMS) invite.

As described above, one aspect of the present technology is the gathering and use of data available from specific and legitimate sources. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver and/or aid targeted emergency support. Accordingly, use of such personal information may provide and/or enhance emergency response.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform voice and/or data communications;
   wherein the one or more processors are configured to cause the UE to:
   establish, while out of range of cellular service, a peer-to-peer communication session with a cooperating UE using a channel in an unlicensed frequency band;
   transmit, using the peer-to-peer communication session, an emergency notification to the cooperating UE, wherein the emergency notification includes an approximate location of the UE;
   communicate with a Public Safety Answering Point (PSAP), wherein communications are relayed between the UE and the PSAP by the cooperating UE via a function of a core network; and
   communicate with a third-party cloud server, wherein communications are relayed between the UE and the third-party cloud server by the cooperating UE.

2. The UE of claim 1,
   wherein the one or more processors are further configured to cause the UE to:
   determine the approximate location of the UE based, at least in part, on a location of the cooperating UE, wherein determining the approximate location of the UE includes performing a ranging procedure with the cooperating UE and receiving the location of the cooperating UE via the peer-to-peer communication session.

3. The UE of claim 1,
   wherein the approximate location of the UE includes a latitude, a longitude, and a height of the UE.

4. The UE of claim 1,
   wherein the peer-to-peer communication session is established using a dedicated peer-to-peer protocol in combination with a 3GPP PC5 communication protocol.

5. The UE of claim 1,
   wherein the peer-to-peer communication session is established using an emergency channel.

6. The UE of claim 5,
   wherein the emergency channel is a dedicated physical channel, wherein the emergency channel is embedded into a broadcasting channel, and wherein the broadcasting channel is a physical sidelink broadcast channel (PSBCH).

7. The UE of claim 1,
   wherein the emergency notification further includes an indication of a type of emergency.

8. The UE of claim 1,
wherein the emergency notification is a data message or a voice call.

9. The UE of claim 1,
wherein the one or more processors are further configured to cause the UE to:
send, via the cooperating UE, at least one of the approximate location of the UE, health information associated with a user of the UE, or UE sensor data to the third-party cloud server.

10. The UE of claim 1,
wherein the one or more processors are further configured to cause the UE to:
transmit, to the cooperating UE, a cell identity announcement request message; and
receive, from the cooperating UE, a cell identity announcement response message, wherein the cell identity announcement response message includes a cell identity for a cell the cooperating UE is camped on.

11. A non-transitory computer readable memory medium storing program instructions executable by processing circuitry to cause a user equipment device (UE) to:
receive, from a remote UE, an emergency notification using a peer-to-peer communication session established between the UE and the remote UE, wherein the emergency notification includes an approximate location of the remote UE, and wherein the remote UE is out of range of cellular service;
establish, on behalf of the remote UE, an SOS access point name (APN) with a function of a core network, based, at least in part, on the approximate location of the remote UE;
relay communications between the remote UE and a Public Safety Answering Point (PSAP) via the function of the core network; and
relay communications between the remote UE and a third-party cloud server.

12. The non-transitory computer readable memory medium of claim 11,
wherein the program instructions are further executable by the processing circuitry to cause the UE to:
receive, from the remote UE, a request to establish the peer-to-peer communication session using an unlicensed frequency band.

13. The non-transitory computer readable memory medium of claim 11,
wherein the approximate location of the remote UE is determined based, at least in part, on a location of the UE, wherein determining the approximate location of the remote UE includes performing a ranging procedure with the remote UE, and wherein the approximate location of the remote UE includes a latitude, a longitude, and a height of the remote UE.

14. The non-transitory computer readable memory medium of claim 11,
wherein the peer-to-peer communication session is established base on at least one of cellular based communications, Wi-Fi based communications, or Bluetooth/Bluetooth Low Energy based communications using an emergency channel.

15. The non-transitory computer readable memory medium of claim 11,
wherein, relay communications between the remote UE and a third-party cloud server, the program instructions are further executable by the processing circuitry to cause the UE to:
forward communications received from the remote UE to the third-party cloud server;
forward communication received from the third-party cloud server to the remote UE; and
forward, from the remote UE to the third-party cloud server, at least one of the approximate location of the remote UE, health information associated with a user of the remote UE, or remote UE sensor data.

16. An apparatus, comprising:
a memory; and
at least one processor in communication with the memory, wherein the at least one processor is configured to:
establish, while out of range of cellular service, a peer-to-peer communication session with a cooperating user equipment device (UE) using a channel in an unlicensed frequency band;
transmit, using the peer-to-peer communication session, an emergency notification to the cooperating UE, wherein the emergency notification includes an approximate location of the UE;
communicate with a Public Safety Answering Point (PSAP), wherein communications are relayed between the UE and the PSAP by the cooperating UE via a function of a core network; and
communicate with a third-party cloud server, wherein communications are relayed between the UE and the third-party cloud server by the cooperating UE.

17. The apparatus of claim 16,
wherein the peer-to-peer communication session is established using a dedicated peer-to-peer protocol.

18. The apparatus of claim 16,
wherein the peer-to-peer communication session is established using an emergency channel, wherein the emergency channel is region specific, and wherein the emergency channel is specified as part of 3GPP PC5 communication protocol.

19. The apparatus of claim 16,
wherein the at least one processor is further configured to:
send, via the cooperating UE, at least one of the approximate location of the apparatus, health information associated with a user of the apparatus, or sensor data to the third-party cloud server.

20. The apparatus of claim 16,
wherein the at least one processor is further configured to:
transmit, to the cooperating UE, a cell identity announcement request message; and
receive, from the cooperating UE, a cell identity announcement response message, wherein the cell identity announcement response message includes a cell identity for a cell the cooperating UE is camped on.

* * * * *